(12) United States Patent
Howard et al.

(10) Patent No.: US 7,433,714 B2
(45) Date of Patent: Oct. 7, 2008

(54) ALERT MECHANISM INTERFACE

(75) Inventors: Dane M. Howard, Sammamish, WA (US); Albert W. Tan, Redmond, WA (US); R. Donald Thompson, III, Mercer Island, WA (US); Paul Jacob Johannes VanderSpek, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1132 days.

(21) Appl. No.: 10/611,364

(22) Filed: Jun. 30, 2003

(65) Prior Publication Data

US 2004/0266491 A1 Dec. 30, 2004

(51) Int. Cl.
*H04B 1/38* (2006.01)
*G04F 1/00* (2006.01)

(52) U.S. Cl. .................... 455/567; 455/566; 455/575.3
(58) Field of Classification Search .............. 455/567, 455/566, 575.1, 575.3, 587; 345/840, 805, 345/473, 474, 475; 702/271
See application file for complete search history.

(56) References Cited

U.S. PATENT DOCUMENTS

| | | | | |
|---|---|---|---|---|
| 5,675,752 A | * | 10/1997 | Scott et al. | 715/866 |
| 5,974,135 A | * | 10/1999 | Breneman et al. | 379/265.04 |
| 6,356,956 B1 | * | 3/2002 | Deo et al. | 719/318 |
| 6,459,440 B1 | * | 10/2002 | Monnes et al. | 715/808 |
| 6,831,568 B1 | * | 12/2004 | Cortopassi et al. | 340/815.4 |
| 6,917,373 B2 | * | 7/2005 | Vong et al. | 715/840 |
| 6,937,950 B2 | * | 8/2005 | Cragun et al. | 702/71 |
| 2003/0087665 A1 | * | 5/2003 | Tokkonen | 455/556 |
| 2003/0142201 A1 | * | 7/2003 | Babka et al. | 348/14.09 |

OTHER PUBLICATIONS

Martin Rennhackkamp, "Using Ingres Event Alerters," Nov. 1992, *DBMS*, pp. 86-92.

* cited by examiner

*Primary Examiner*—Melur Ramakrishnaiah
(74) *Attorney, Agent, or Firm*—Brett A. Hertzberg; Merchant & Gould

(57) ABSTRACT

An apparatus, system, and method are generally related to an alert mechanism. The alert mechanism is activated by the detection of one or more triggers, where the triggers can be categorized as time based and event based. Time-based triggers include timer based functions and scheduler based functions, while event-based triggers include internal alert functions and message based alert functions. Alerts are processed based on a priority scheme. Alerts take over the display area until dismissed by activation of one or more selectors by the user. Indicators may be included in a display screens to keep the user informed of ongoing changes in the alert status.

40 Claims, 18 Drawing Sheets

ALERT MECHANISM INTERFACE

FIELD OF THE INVENTION

The present invention relates generally to an alert mechanism. More particularly, the present invention relates to an apparatus, system, and method for providing an alert mechanism that is useful for an electronic device such as a watch.

BACKGROUND OF THE INVENTION

As society becomes increasingly mobile, mobile electronic devices are enjoying a tidal wave of popularity and growth. Cell phones, wireless PDAs, wireless laptops and other mobile communication devices are making impressive inroads with mainstream customers. Some types of mobile electronic devices are processor-controlled, with a user interface to allow the user to more easily and intuitively operate the device. For example, some mobile telephones include a display unit that displays graphical data to support email, web browser, and other non-voice features. Manufacturer of mobile electronic devices often utilize buttons on the mobile electronic device to navigate through various menus and display the graphical data.

SUMMARY OF THE INVENTION

An apparatus, system, and method are generally related to an alert mechanism. The alert mechanism is activated by the detection of one or more triggers, where the triggers can be categorized as time based and event based. Time-based triggers include timer based functions and scheduler based functions, while event-based triggers include internal alert functions and message based alert functions. Alerts are processed based on a priority scheme. Alerts take over the display area until dismissed by activation of one or more selectors by the user. Indicators may be included in a display screens to keep the user informed of ongoing changes in the alert status.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENTS

Figure 1:
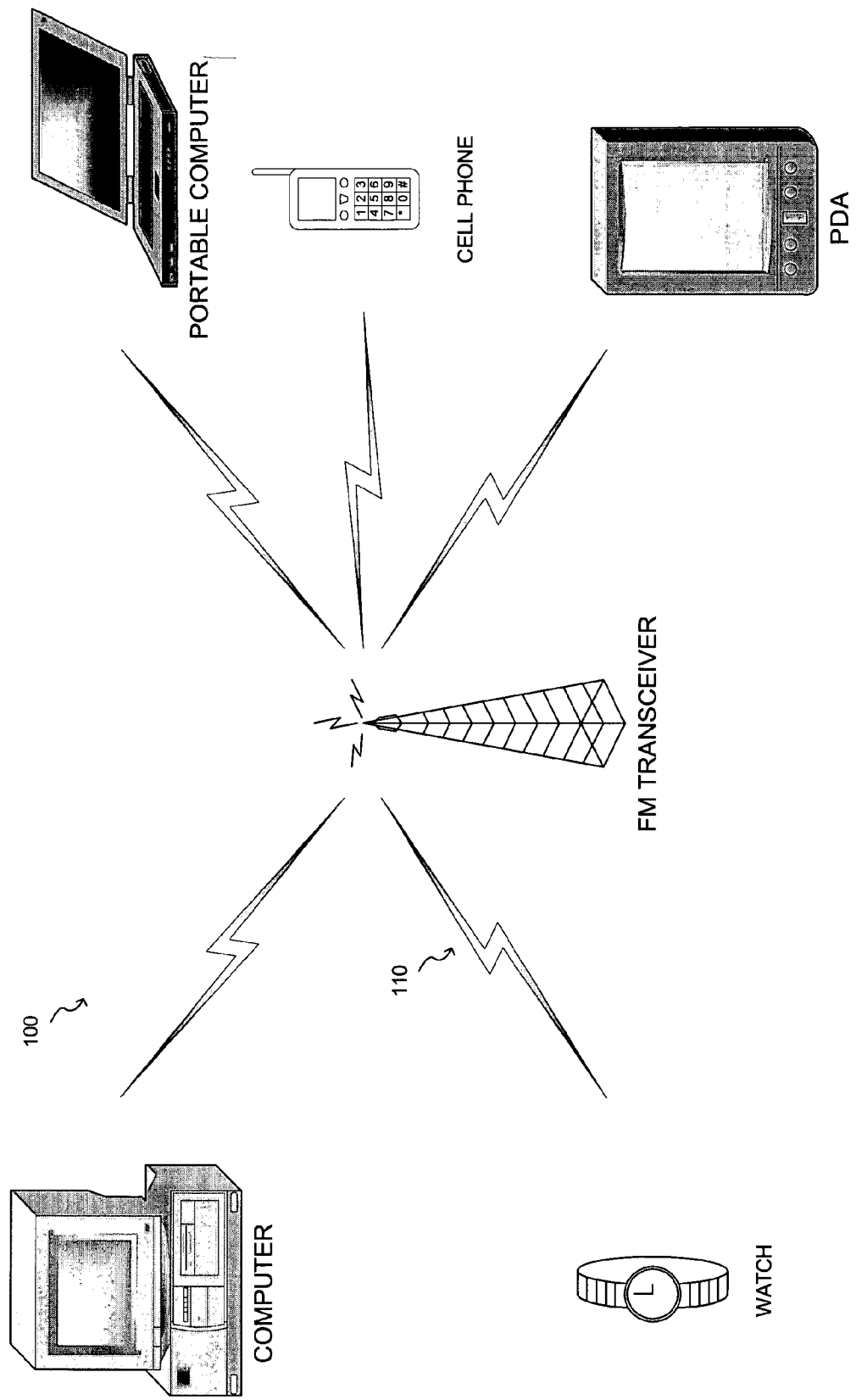
FIG. 1 is a diagram illustrating an operating environment.

The present invention is described in the context of an alert mechanism for an electronic device. In the described embodiments, the electronic devices may be watch type devices that are specially configured to receive communication signals. As will become apparent from a reading of the following detailed description, the electronic devices may be configured to receive broadcast transmission from one or more broadcast towers. The electronic devices may be capable of receiving and processing messages from the broadcast transmissions. The electronic devices store the received information such that the information is indexed according to designated channels. After information is received and processed by the client device, a user may passively or actively review the information that is stored in the electronic device. Various alerts may be associated with the electronic device such as: a low battery alert, an alarm clock alert, a timer alert, and a registration alert. Other alerts may be associated with information that is stored in the electronic device such as alerts for scheduled appointments from a calendar, alerts for a newly arrived message, as well as other information based events.

Although described here in the context of a watch-based system, it will be apparent that the teachings of the application have equal applicability to any other mobile or non-mobile devices, such as portable and desktop computers, personal digital assistants (PDAs), cellular telephones, and the like. The use of a watch is for illustrative purposes only to simplify the following discussion, and may be used interchangeably with "mobile device" and/or "electronic device".

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

The term "content" can be any information that may be stored in an electronic device. By way of example, and not limitation, content may comprise graphical information, textual information, and any combination of graphical and textual information. Content may be displayable information or auditory information. Auditory information may comprise a single sound or a stream of sounds.

The apparatus, system, and method of the present invention are generally related to an alert mechanism user interface. The alert mechanism interface may be employed in an electronic device such as a watch. Content may be stored on the electronic device that includes a time sensitive trigger. Other triggers may also be provided in the electronic device such as a low battery trigger, an alarm trigger (e.g., an alarm clock function), a timer trigger (e.g., a countdown timer), as well as others. The alert mechanism is activated by one or more of the triggers.

The overall operating environment for the present invention will be discussed as follows below with reference to FIGS. 1-2.

Example Operating Environment

FIG. 1 illustrates an example operating environment (100) for the present invention. As illustrated in the figure, an FM transceiver or broadcast is transmitted over a communication channel (110) to various electronic devices. Example electronic devices that have an FM receiver or transceiver may include a desktop computer, a watch, a portable computer, a wireless cellular telephone (cell phone), and a personal data assistant (PDA). The electronic devices are arranged to receive information from the FM broadcast. The FM broadcast may be of any number of types including but not limited to: a standard FM transmission, a sub-carrier FM transmission, or any other type of FM transmission as may be desired.

Example electronic devices that may include an electronic system that is arranged to operate according to the interaction model are illustrated in FIG. 1. The electronic system may employ a wireless interface such as the FM transmission systems that are described above. Each of the electronic systems receives messages/information over the communication channel.

Each broadcast transmission corresponds to the transmission of one or more frames. Each frame may include multiple messages, where some messages are public broadcast (aka "global" or "shared" messages), while other messages are client specific messages (aka "personal" or "private" messages). Every client that is located within the designated service region may receive shared messages, while a single client may decode a private message.

Electronic devices (e.g., a wireless watch device) receive message packets according to shared and private messages that are directed to the client device. Message packets are organized in groups according to logical slot (or channel) entry numbers. For example, a particular electronic device is configured to receive a selected group of channels from the available channels. The message packets associated with each of those channels is received, processed, and stored in the client device. The stored message packets can be reviewed using a user interface that employs an interaction model, in accordance with the present invention.

Example channels include: a time channel, a messages channel, a contact channel, a calendar channel, a weather channel, a stocks channel, a news channel, and a games channel. Messages associated with each channel include message content that is based on the particulars of the channel. For example, the calendar channel may include a series of time sensitive appointments that are associated with particular times and days of the month. In this example, each of the calendared appointments can be used to activate the alert mechanism when the trigger time associated with the appointment(s) is reached.

Example Electronic Device

Figure 2:
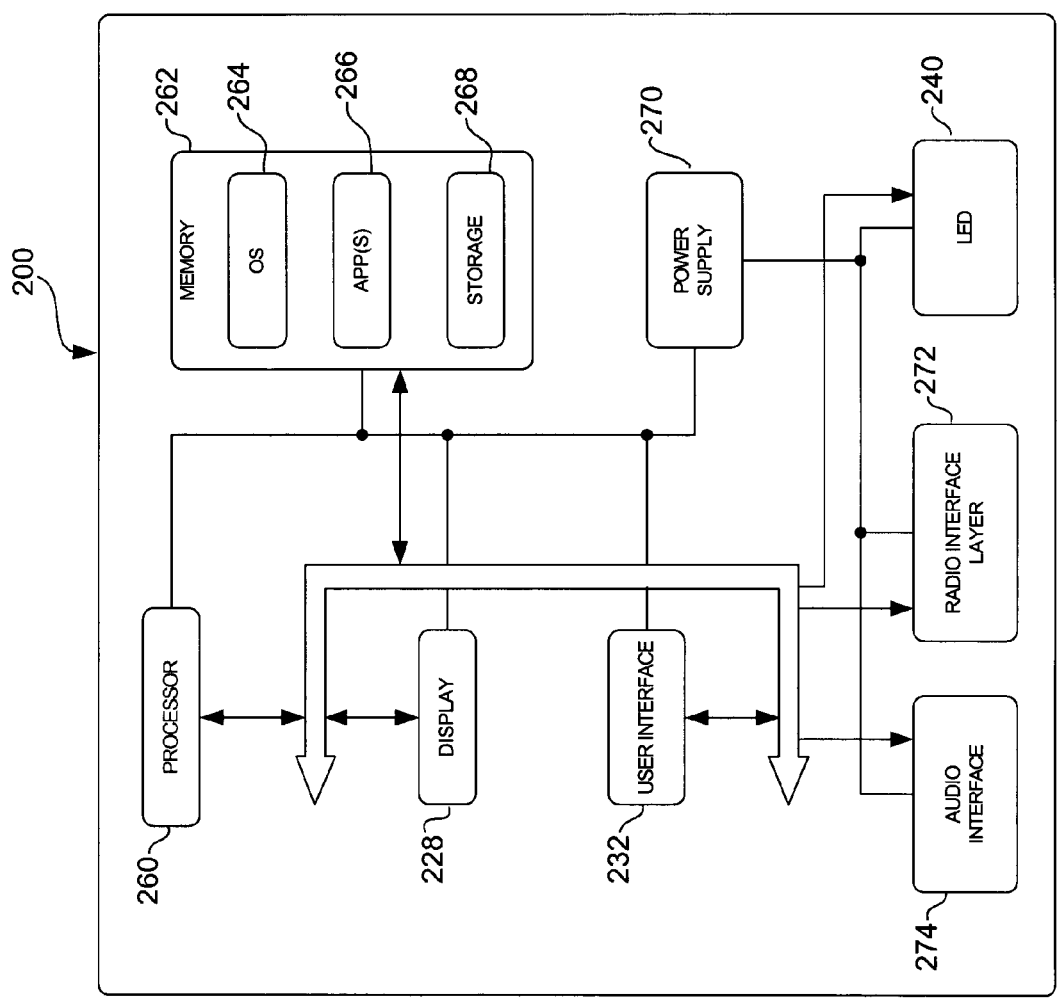
FIG. 2 is a schematic diagram illustrating an electronic device.

FIG. 2 is a schematic diagram illustrating functional components of an illustrative electronic device (200). The electronic device (200) has a processor (260), a memory (262), a display (228), and a user interface (232). The memory (262) generally includes both volatile memory (e.g., RAM) and non-volatile memory (e.g., ROM, Flash Memory, or the like). The electronic device (200) includes an operating system (264), such as the Windows CE operating system from Microsoft Corporation or another operating system, which is resident in the memory (262) and executes on the processor (260). The user interface (232) may be a series of push buttons, a scroll wheel, a numeric dialing pad (such as on a typical telephone), or another type of user interface means. The display (228) may be a liquid crystal display, or any other type of display commonly used in electronic devices. In one example, the display (228) may be touch-sensitive that would act as an input device.

One or more application programs (266) are loaded into memory (262) and run on the operating system (264). Examples of application programs include phone dialer programs, email programs, scheduling/calendaring programs, PIM (personal information management) programs, Internet browser programs, and so forth. The electronic device (200) also includes a non-volatile storage (268) that is located within the memory (262). The non-volatile storage (268) may be used to store persistent information which should not be lost if the electronic device (200) is powered down. The applications (266) may use and store information in the storage (268), such as e-mail or other messages used by an e-mail application, contact information used by a PIM, appointment information used by a scheduling program, documents used by a word processing application, and the like.

The electronic device (200) has a power supply (270), which may be implemented as one or more batteries. The power supply (270) might further include an external power source, such as an AC adapter or a powered docking cradle that supplements or recharges the batteries.

The electronic device (200) is also shown with two types of external notification mechanisms: an LED (240) and an audio interface (274). These devices may be directly coupled to the power supply (270) so that when activated, they remain on for a duration dictated by the notification mechanism even though the processor (260) and other components might shut down to conserve battery power. The LED (240) may be programmed to remain on indefinitely until the user takes action to indicate the powered-on status of the device. The audio interface (274) is used to provide audible signals to and receive audible signals from the user. For example, the audio interface (274) may be coupled to a speaker for providing audible output and to a microphone for receiving audible input, such as to facilitate a telephone conversation, or as a user interface using voice recognition. In another example, a vibration device (not shown) can be used to give feedback to the user such as for alerting the user of a newly arrived message. The electronic device (200) can control each alert mechanism separately (e.g., audio, vibration, as well as visual cues).

The electronic device (200) also includes a radio interface layer (272) that performs the function of receiving and/or transmitting radio frequency communications. The radio interface layer (272) facilitates wireless connectivity between the electronic device (200) and the outside world, via a communications carrier or service provider. Transmissions to and from the radio interface layer (272) are conducted under control of the operating system (264). In other words, communications received by the radio interface layer (272) may be disseminated to application programs (266) via the operating system (264), and vice versa.

Figure 3A:
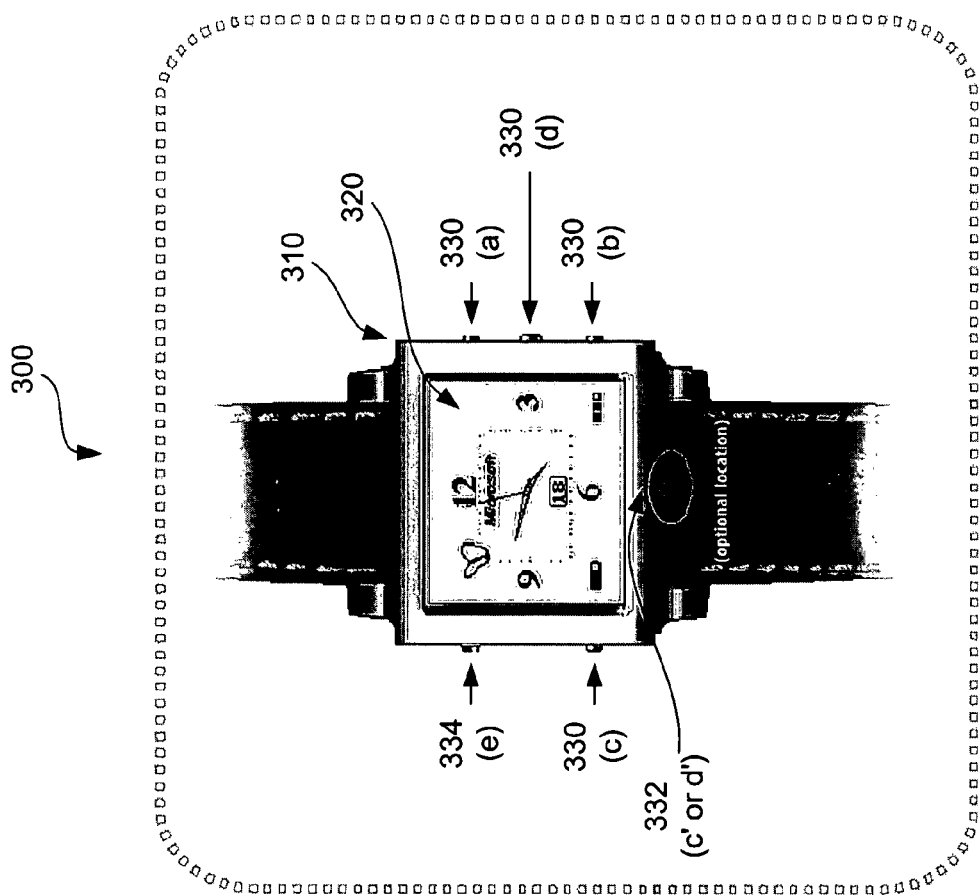
FIGS. 3A-3B are diagrams that illustrate watch devices that include a user interface.
Figure 3B:
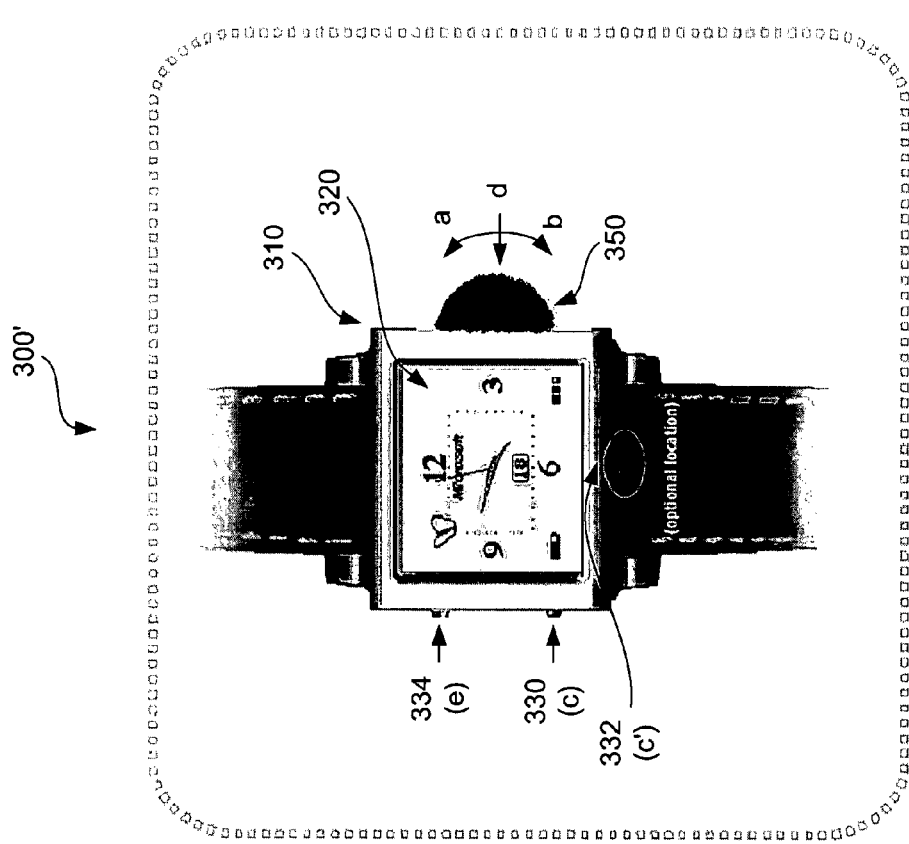

In one example of the present invention, electronic device 200 is a mobile electronic device such as a watch device that includes a wireless interface. Exemplary user interfaces for a watch device are shown in FIGS. 3A and 3B, as will be described below. Although the below-described user interface configurations include multiple selector buttons (e.g., four selector buttons), the functions of many of the selector buttons may be combined by a single selector (e.g., a button, a rocket switch, a wheel, etc.).

Example User Interfaces (UI)

FIG. 3A illustrates an exemplary watch device (300) that includes a user interface that is configured for a calendar interface. The watch device (300) includes a bezel (310), which has an electronic system (e.g., see FIG. 2). The electronic system performs the functions in a manner that is consistent with the hardware that was previously described with respect to FIG. 2. The bezel (310) has a display (320) such as a liquid crystal display, a multiple bit display, or a full color display. In one embodiment, watch hands are electronically generated on the display (320). In an alternative embodiment, the bezel includes analog-type watch hands that do not detrimentally interfere with the display (320). The watch device (300) includes a series of selectors such as buttons (330) that are arranged to operate as part of a user interface (UI).

Every selector (e.g., buttons 330) has a default function, and/or a context determined function. The currently selected channel determines the context for each selector. Alternatively, the currently active display may determine the context for each selector. For example, a display screen (e.g., a help screen) may be superimposed on the main display such that the display screen becomes the active context. The electronic device (300) is context sensitive in that the function that is associated with each selector may change based on the selected channel or display screen.

A first one of the selectors, button "a" (330) has a default function of page up or previous page in the currently selected channel. The first selector, button "a" (330), also has an alternate function based on currently selected channel or display. For example, the first (e.g., "a") selector may be configured to activate a list browse function after the "a" selector is activated for a predetermined time interval. In the list browse function, a pop-up visual cue (e.g., a pop-up window) indicates how that list is indexed. Each record (e.g., a day of appointments or events, a full month view calendar, etc.) can be indexed by things such as date, month, categories, or any other way of indexing a record. The list browse indexing allows a user to quickly access records located within the list.

In one example, the calendar channel may include a calendar view that includes a graphical representation of the current month in a graphical format. When the currently selected view is the calendar view, the first selector may be activated to select the previous month, or selecting a list browse function for choosing a month view. The list browse function may be activated by depressing the first selector for a predetermined time period. For example, when the selector is a button as shown in FIG. 3A, the button may be held for a timeout interval such as two seconds before the month view browser feature is activated.

A second one for the selectors, button "b" (330) has a default function of page down or next page in the currently selected channel. The second selector, button "b" (330), may also have an alternate function based on currently selected channel or display. In one example, the second selector is activated for a predetermined time interval (e.g., two seconds) to select "delete appointment" function in the calendar channel. In another example, the second selector is activated for a predetermined time interval to select a "list browse" function- in the calendar channel (e.g., see previous discussion). A list browse function can be used quickly locate records in the list by indexing the record sets according to: dates, numbers, categories, or any other appropriate index.

A third one of the selectors, button "c" (330) has a default function of next channel. The third selector, button "c" (330), may also have an alternate function based on the currently selected channel or display. In one example, the third selector is activated for a predetermined time interval (e.g., two seconds) to select the main channel or "primary" channel. The main channel in an example watch device is the time screen. However, devices may be configured to have some other display screen that is recognized by the device as a "primary" channel or "home" location. In another example, the third selector is activated to dismiss a pop-up window such as a scheduled alert.

A fourth one of the selectors, button "d" (330) has a default (or "primary") function of "enter". The "enter" function is context sensitive and used to select the "enter" function within a selected channel (e.g., enter Next Appointment Mode), or to select an item from a selection list (e.g., select November Appointments in a calendar view list browse). The fourth selector, button "d" (330), may also have an alternate function based on the currently selected channel or display. For example, the fourth selector is activated for a predetermined time interval (e.g., two seconds) to activate a help screen or an additional set mode. In this example, the help screen remains active while the fourth selector is activated (e.g., maintaining button "d" as depressed), and the help screen is deactivated (e.g., removed from the display) when the fourth selector is deactivated (e.g., by releasing button "d").

The four selectors are arranged such that the electronic device accomplishes navigating and selecting content on each channel in a simple manner. An optional fifth selector (e.g., button "e", 334) may be arranged to provide other functions such as backlighting or another desired function. An optional sixth selector (e.g., button "f") may be arranged to operate as a "channel back" function such that navigation through channels may be accomplished in a forward and reverse direction.

In an alternative example, the third selector (e.g., button "c") may be located in the bottom center region of the watch bezel as illustrated by selector 332. In yet another example, the fourth selector (e.g., button "d") is located in the bottom center region of the watch bezel as illustrated by selector 332.

FIG. 3B illustrates another exemplary watch device (300') that includes a user interface to an electronic system that is configured to operate in accordance with the present invention. The watch device (300) is arranged in a substantially similar manner as that discussed with respect to FIG. 3A. However, the first, second, and fourth selectors (e.g., buttons "a", "b", and "d") are replaced with a wheel type of device (350). The functions of the "a" and "b" selectors are activated by rotating the wheel device (350) in a counterclockwise and clockwise manner. The functions of the "d" selector are activated by pressing the wheel device (350) towards the watch bezel.

In an alternative example, the "a" and "b" button-type selectors are replaced by a rocker-type of switch that may be depressed toward the locations of the "a" and "b" selectors illustrated in FIGS. 3A and 3B. In still another example, a touch screen interface is employed as the selectors for the watch device. Other examples of selector mechanisms may be employed.

The description that follows below includes examples of communication between broadcast towers and client devices such that client devices receive and store content. The communication method is for illustrative purposes only and is not required by every client device. Any client device that navigates stored content is considered within the scope of the described systems and methods.

Broadcast Channels

Figure 4:
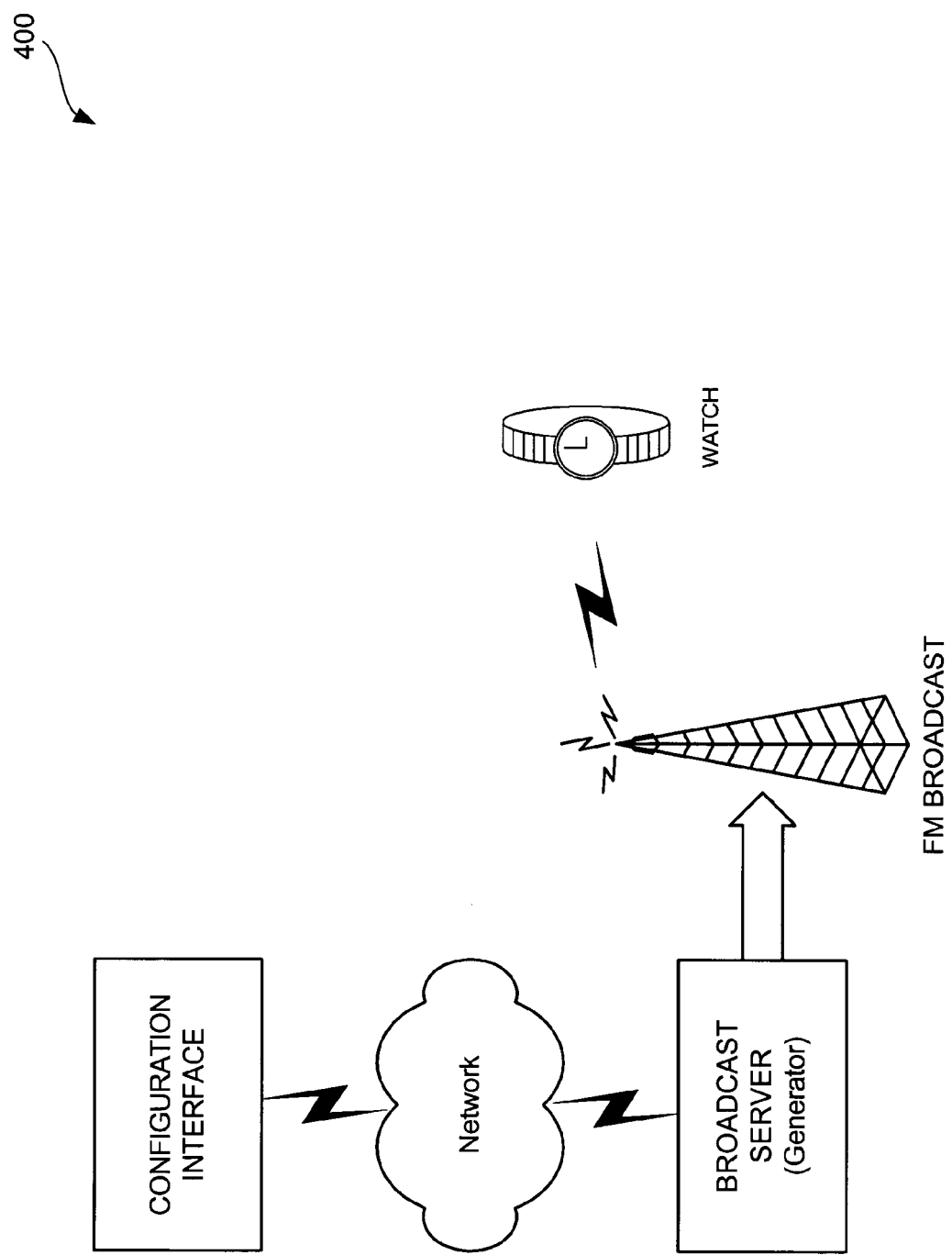
FIG. 4 is a block diagram of a broadcast system that includes a configuration interface.

Each broadcast transmitter tower is arranged to provide a communication signal that is configured for reception by electronic devices that are located within a service region. An exemplary FM broadcast tower transmits signal as directed by a broadcast server device as shown in FIG. 4. The broadcast server device (aka a "generator") may communicate with a configuration interface via a network communication link.

The configuration interface is configured as a means for selecting one or more services. In one example, a wireless client device user interacts with the scheduling interface to select services such as news, stock prices, weather, and other features such as a personal calendar, address book, and the like. Selected services are entered in a database for broadcast transmission at a later time. At the designated time (or time interval) the scheduling interface communicates with the broadcast server to begin a transmission sequence of data for the selected services. The broadcast server subsequently formats the data for reception by one or more wireless client device, queues the data for transmission, and communicates the queued data to the FM broadcast tower for transmission. In an alternative example, the scheduling interface communicates the selected services to the broadcast server. The broadcast server schedules the time interval for transmission of the selected service.

Each broadcast transmission corresponds to the transmission of one or more frames that are arranged in accordance with a frame protocol. Each frame may include multiple messages, where some messages are public broadcast (aka "global" or "shared" messages), while other messages are client specific messages (aka "personal" or "private" messages). Each frame includes a table of contents that indicates the extent of messages that are found within the next transmitted frame. Every client that is located within the designated service region may receive shared messages, while a single client may decode a private message.

Each frame includes a header, a table of contents, and a message payload that includes the content for one or more selected services as previously described. The header also includes other information such as authentication data, identified service region, language, available stations for the identified service region, frame number, and time stamp. Control information may also be included in one of the headers to indicate broadcast conditions such as a change in available channels, an assignment of a service region to a particular wireless client device, and an assignment of a particular channel (frequency). In one example, each frame includes a change counter in one of the headers to indicate a change has taken place in the system. Wireless client devices (clients) may use the change counter to determine when to initiate a failover (when a broadcast tower becomes unavailable).

Client devices can determine the current service region based on information that is included in the broadcast transmissions. The time zone can be determined based on the current service region such that the client device can adjust appointments, schedules, alarms, current time, and other time information based on the current time zone. Moreover, the time and date functions of the client device may be synchronized based on information that is included in the broadcast transmissions.

Process Flow

Figure 5A:
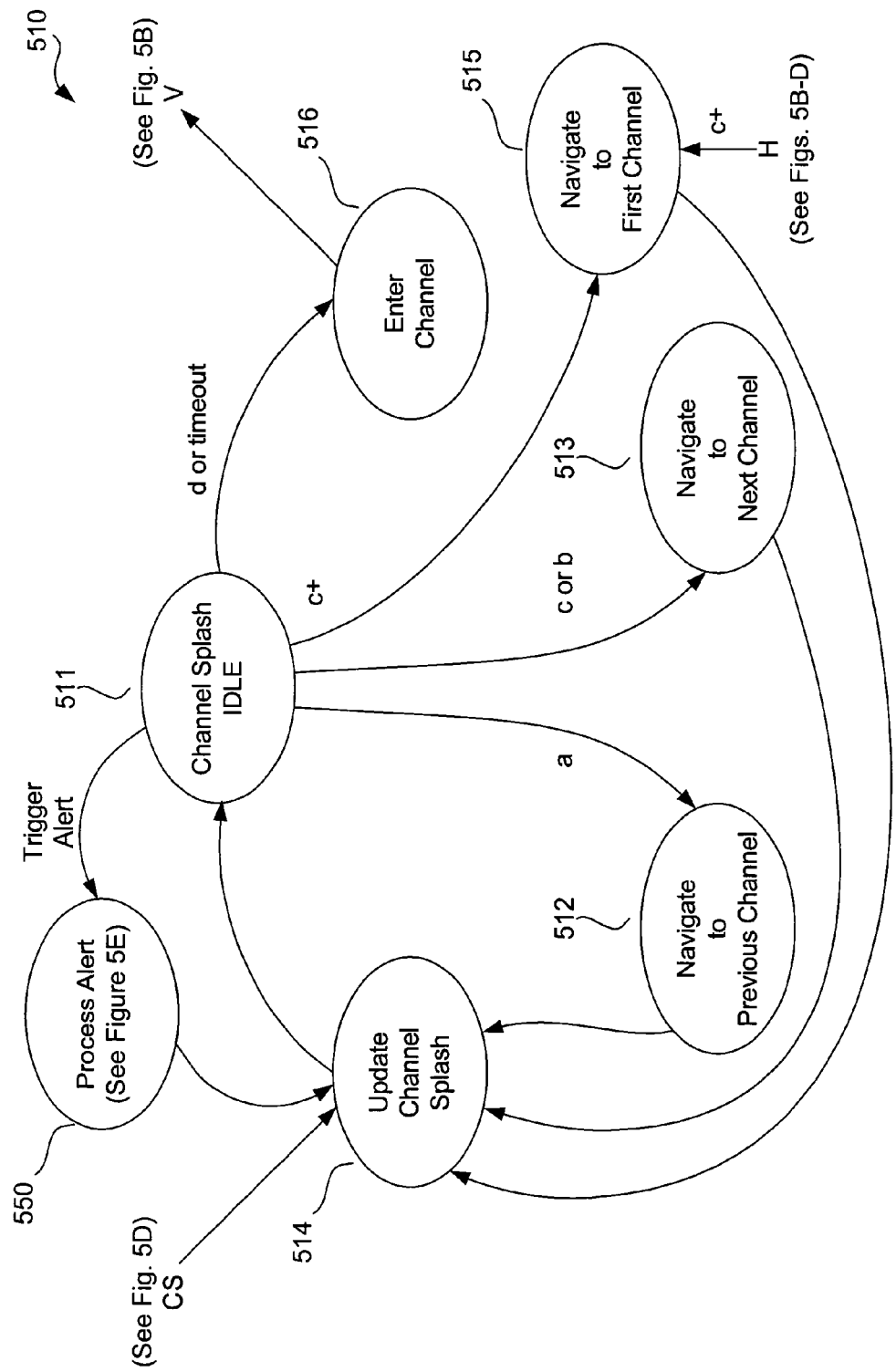
FIGS. 5A-5E are process flow diagrams for passive and active navigation functions of a electronic device.
Figure 5B:
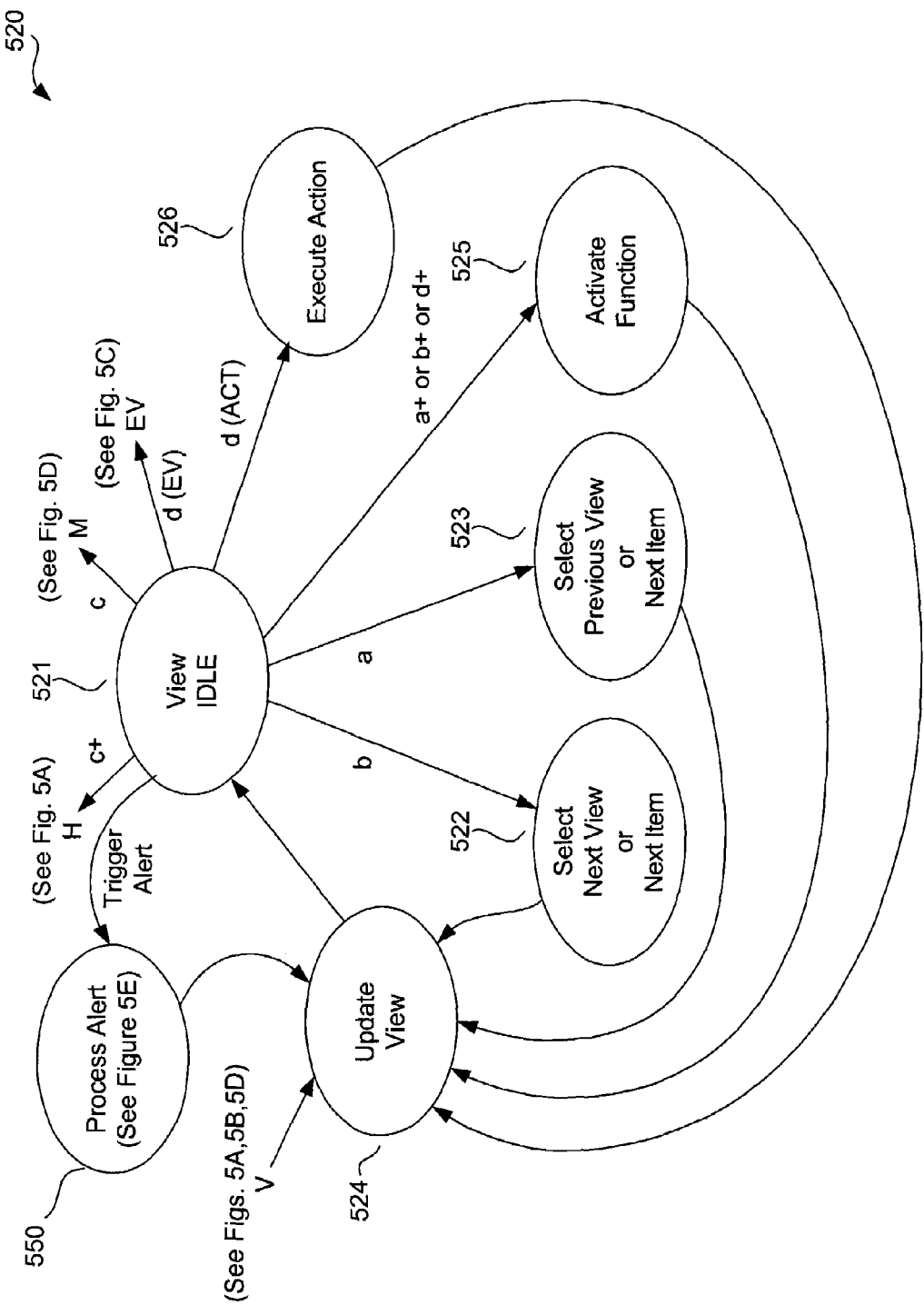
Figure 5C:
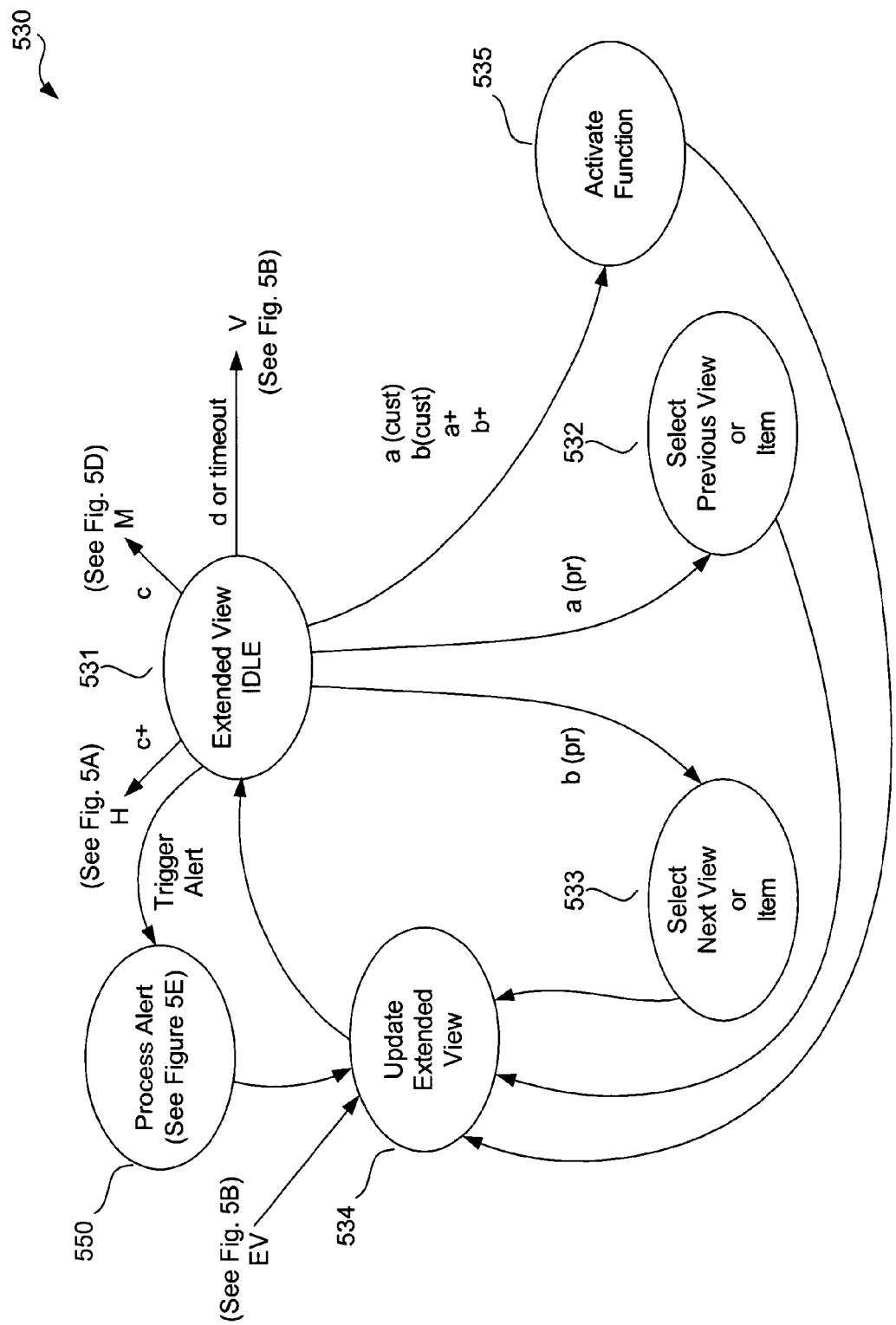
Figure 5D:
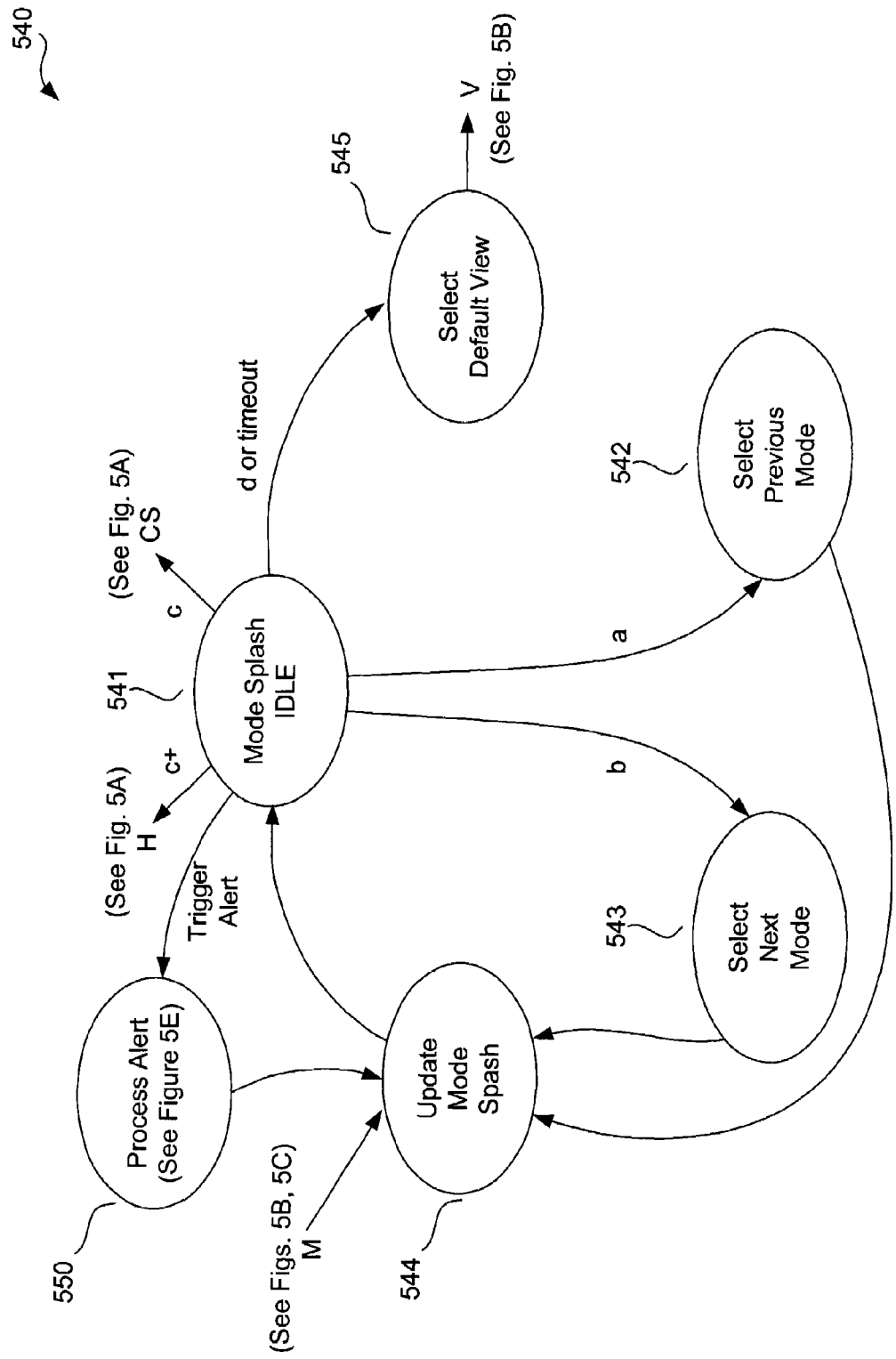
Figure 5E:
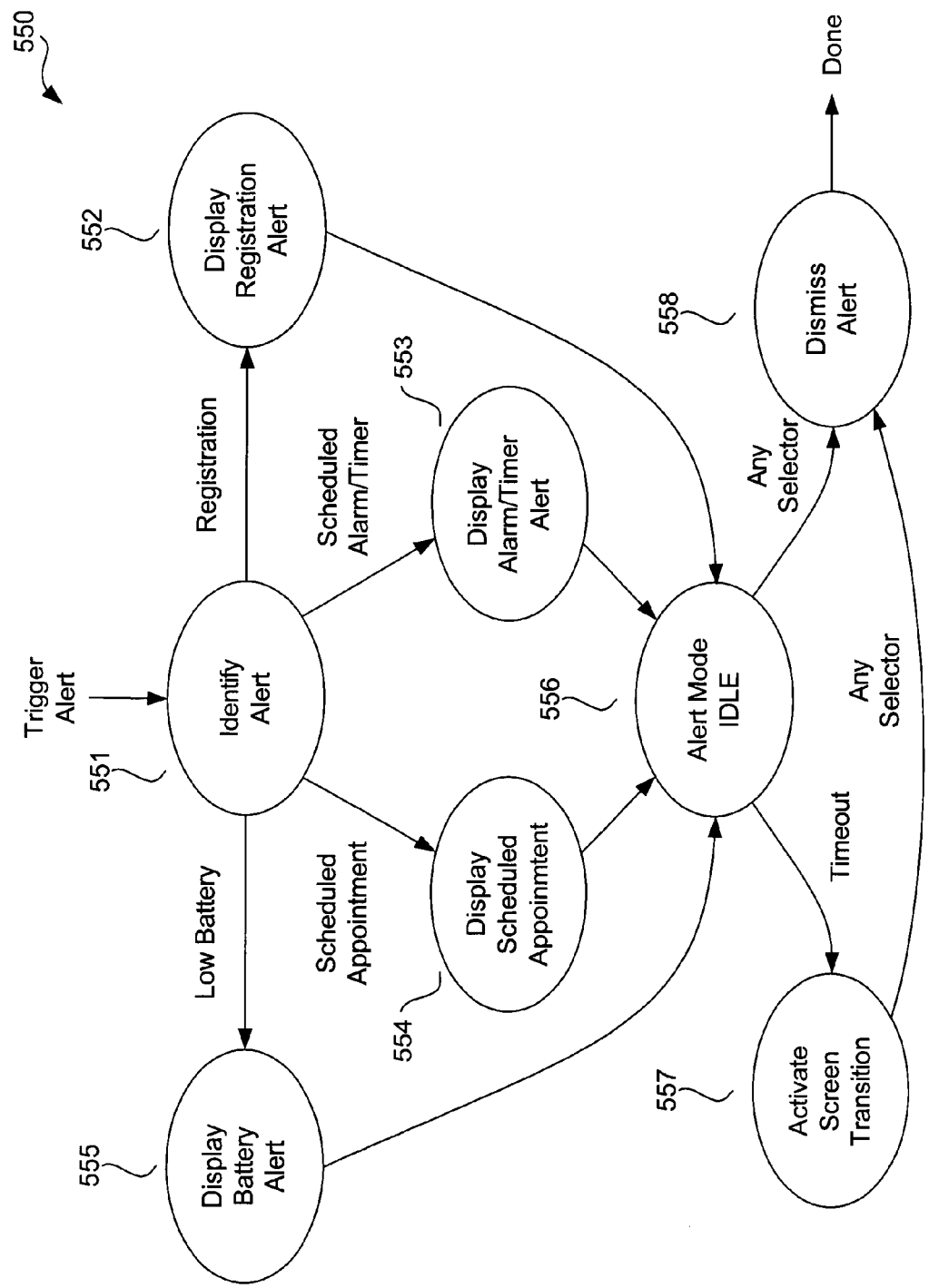

Process flow diagrams for navigation and alert function of an example electronic device are illustrated in FIGS. 5A-5E. The process flow diagram illustrated in FIG. 5A is predominately focused on channel splash activity. The process flow diagram illustrated in FIG. 5B is predominately focused on view activity. The process flow diagram illustrated in FIG. 5C is predominately focused on extended view activity. The process flow diagram illustrated in FIG. 5D is predominately focused on mode splash activity. The process flow diagram illustrated in FIG. 5E is predominately focused on alert mode activity.

Every electronic device has at least one channel that corresponds to the home channel. For a watch type of device, the home channel corresponds to a time channel. However, different home channels can be assigned to every electronic device. Whenever the currently selected channel corresponds to the home channel, the previous channel corresponds to the last channel (if more than one channel exists on the device). Similarly, the next channel corresponds to the home channel when the current channel is the last channel in the channel list for the electronic device.

Every electronic device has a set of selectors (or buttons) that are selectively activated to navigate various functions in the device. Example selectors are illustrated in FIGS. 3A-3B. For the purposes of the discussion below, each selector is indicated by a letter such as a "a", "b", "c", and "e". Some alternate selector functions may be chosen by sustained activation of a selector button for a predetermined time interval (e.g., two seconds). The alternate selector functions are generally indicated in the figures by a "+" symbol that is adjacent to the selector functions' designating letter (e.g., "c+").

The example electronic device described below includes at least four selectors as indicated by letters "a", "b", "c", and "d". The "e" selector may be arranged to provide additional functions such as backlighting, a back channel selector, as well as any other desired function. Additional extended functions may also be accessible through multiple selector combinations. For example, holding the "d" and "a" selectors together ("d+" & "a+") for a predetermined time interval can be done to select special settings in the electronic device such as a "screen adjust" function. Additional extended functions can also be accomplished using other selector combinations such as "d+" & "b+", "a+" & "b+", as well as others.

Channel Splash Operating State

The channel splash operating state is described as follows below with reference to FIG. 5A.

The electronic device activates the channel splash operating state when the electronic device is initialized (e.g., just after a power-up sequence). The electronic device has a default initial channel that is referred to as a home channel. The display is updated to indicate the currently selected channel at block 514. Processing continues to block 611 where the channel splash operating state is maintained in an idle state. The electronic system in the electronic device monitors the user interface (e.g., the four selector) while in the channel splash IDLE state. When the user activates one or more of the selectors (e.g., one of four selectors), processing leaves the channel splash IDLE state.

The display actively maintains the splash screen to indicate the current channel selection while the channel splash IDLE state is active at block 511. Splash screens may include one or more graphic elements and/or text elements. An example channel splash screen for a calendar channel is illustrated as 610 in FIG. 6. Channel splash screen 610 is illustrated as including a date indicator that changes for each day of the month. Splash screens may be accompanied by the activation of sound that provides an audible indicator that the channel has changed. The sound associated with the audible indicators may be the same for each channel splash screen, or unique based on either the particular channel or the particular channel type (e.g., news channels are one type, while messages are another type).

Processing flows from the channel splash IDLE state (511) to the "navigate up" or "navigate to previous channel" function (512) when the "a" selector is activated (e.g., depressing an "a" button). Processing continues from block 512 to block 514, where the display is updated based on the newly selected channel. After the display is updated, processing returns to the channel splash IDLE state (511).

Processing flows from the channel splash IDLE state (511) to the "navigate down" or "navigate to next channel" function (513) when either the "b" selector or the "c" selector is activated (e.g., depressing either the "b" or "c" button). Processing continues from block 513 to block 514, where the display is updated based on the newly selected channel. After the display is updated, processing again returns to the channel splash IDLE state (511).

Processing flows from the channel splash IDLE state (511) to the "navigate to first channel" or "navigate to home channel" function (515) when the "c+" selector is activated. The home channel navigation function can be accessed from any channel of the electronic device. The electronic device navigates to the home channel (e.g., the time channel on a watch device) when the "navigate to home channel" function is activated. Processing continues from block 513 to block 514, where the display is updated based on the newly selected channel (i.e., the home channel). After the display is updated, processing again returns to the channel splash IDLE state (511).

Processing flows from the channel splash IDLE state (511) to the "enter channel" function (516) when the "d" selector is activated (e.g., depressing a "d" button). Alternatively, the "enter channel" function is activated when the electronic system is maintained in the channel splash IDLE state for a predetermined time interval (e.g., a 2 second timeout) without activation of a selector. Processing flows from block 516 to block 524 (see FIG. 5B) when the "enter channel" function is activated as indicated by "V".

The enter channel function performs a series of initializations in the electronic device prior to leaving the channel splash operating state and entering the channel view operating state. Every channel in the electronic device has at least one operating mode. The electronic device selects the current operating mode as a default mode, and a current view as a default view in the currently selected channel when the "enter channel" function is activated. In one example, a calendar channel has a next appointment operating mode, a day view operating mode, an event view operating mode, and a month view operating mode. Multiple views may be associated with each operating mode.

Processing flows from the channel splash IDLE state (511) to the process alert function (550) when a trigger alert is activated (e.g., a pre-specified time is reached). After the alert is processed, processing flows to block 514, where the channel splash is updated. The alert mode operating state is described in further detail below with reference to FIG. 5E.

Channel View Operating State

The channel view operating state is described as follows below with reference to FIG. 5B.

The electronic device enters the channel view operating state at entry point V, where the selector functions associated with the currently selected channel and operating mode are mapped to the selectors. The display is updated to indicate the currently selected view at block 524. Processing continues to block 521 where the channel view operating state is maintained in an IDLE state. The electronic system in the electronic device monitors the user interface (e.g., the four selector) while in the view IDLE state. When the user activates one or more of the four selectors, processing leaves the view IDLE state.

The display actively maintains the current view while the view IDLE state is active at block 521. List type views include lists of items that can be selected. Other types of views are simply graphical and/or textual elements that are arranged in a display view. Example views are illustrated in FIGS. 7 through 11. Views may be accompanied by the activation of sound that provides an audible indicator that the view has changed. The sound associated with the audible indicators may be the same for each view (e.g., a beep type of indicator or sound clip), or unique based on the particular view. In one example, an audible indicator is activated when a particular alert notification function is activated.

Processing flows from the view IDLE state (521) to the "previous view" or "previous item" function (522) when the "a" selector is activated (e.g., depressing an "a" button). Processing continues from block 522 to block 524, where the display is updated based on the newly selected view. After the display is updated, processing returns to the view IDLE state (521). In one example, the previous view corresponds to the last view when the currently selected view is the first available view in the current mode for the current channel. In another example, the previous view corresponds to a null when the currently selected view is the first available view in the current mode for the current channel. In still another example, the previous item in a list is highlighted when the "a" selector is activated.

Processing flows from the view IDLE state (521) to the "next view" or "next item" function (513) when the "b" selector is activated (e.g., depressing the "b" button). Processing continues from block 523 to block 524, where the display is updated based on the newly selected view. After the display is updated, processing again returns to the view IDLE state (521). In one example, the next view corresponds to the first view when the currently selected view is the last available view in the current mode for the current channel. In another example, the next view corresponds to a null when the currently selected view is the last available view in the current mode for the current channel. In still another example, the next item in a list is highlighted when the "b" selector is activated.

Processing flows from the view IDLE state (521) to the "mode splash" function when the "c" selector is activated as indicated by "M". Refer to FIG. 5D and related discussion for details.

Processing flows from the view IDLE state (521) to the select home channel splash function when the "c+" selector is activated as indicated by "H". Refer to FIG. 5A and related discussion for details.

The "d" selector is defined within the context of the current channel, mode, and view. The "d" selector may be defined as an "enter extended view" function, a "select" function, or a "execute action" function. Not every view in a given channel/mode has an extended view as may be indicated by a null value. Some views may have an action function that is defined within the context of the view in the currently selected mode/channel. The context for each view is assigned to the mode upon entry into the mode for the current channel.

Processing flows from the view IDLE state (521) to the "enter extended view" function when the "d" selector is activated (e.g., depressing a "d" button) and the extended view is available as indicated by "d(EV)". The extended view is available when defined within the context of the currently selected view. For example, the extended view may be available for a list type view such that the highlighted list item is selected when the "d" selector is activated, and a detailed view associated with the highlighted item is displayed as an extended view. Refer to FIG. 5C and related discussion for details on the extended view processing.

Processing flows from the view IDLE state (521) to the "execute action" function at block 526 when the "d" selector is activated and the action function is available as indicated by "d(ACT)". The action function is defined within the context of the currently selected view. For example, a fortune cookie mode may be available in an entertainment channel. Although the fortune cookie mode may only have a single view, the "d" selector may be mapped to an action function that randomly selects fortunes from a list when the "d" selector is activated. After the action is performed (e.g., retrieve random fortune from list, execute an animation sequence), processing continues to block 524 where the display is updated as previously described.

Other special functions may be mapped to the "a+", "b+", and "d+" selectors within the context of the current view. By activating the corresponding selector for a predetermined time interval (e.g., 2 seconds) the corresponding special function is activated as indicated by block 525. Processing continues from block 525 to block 524 where the display is updated as previously described.

In one example, a list browser function is available in a mode that corresponds to a monthly view in the calendar channel. For this example, activation of the "a" and "b" selectors result in manual navigation through views that correspond to previous or subsequent months. Activation of the "a+" or "b+" selector may activate an index function that displays an index indicator (e.g., see 1030 in FIG. 10) such as "Nov. 03". "Dec. 03", "Jan 04", etc. After the index function is active, the "a" and "b" are mapped into scroll up and down functions, "c" is mapped to a cancel function, and "d" and/or "timeout" are mapped to a select current index function. The indexing system can be any alpha-numeric type of indexing system as defined within the scope of the current view.

In another example, an erase function is available in a view that corresponds to a specific appointment in the next appointment mode for the calendar channel. For this example, activation of the "a" and "b" selectors manually navigates through various appointments one at a time. Activation of the "d+" selector may activate an erase function that removes the currently selected appointment from the electronic device.

In still another example, processing may flow from the view IDLE state (521) to the "alternate view" function (e.g., see FIG. 11) when the electronic system is maintained in the channel splash IDLE state for a predetermined time interval (e.g., a 2 second timeout) without activation of a selector.

Processing flows from the view IDLE state (521) to the process alert function (550) when a trigger alert is activated (e.g., a pre-specified time or event occurs). After the alert is processed, processing flows to block 524, where the channel view is updated. The alert mode operating state is described in further detail below with reference to FIG. 5E.

Extended View Operating State

The extended view operating state is described as follows below with reference to FIG. 5C.

The electronic device enters the extended view operating state at entry point EV, where the selector functions associated with the currently selected extended view are mapped to the selectors. The display is updated to indicate the currently selected extended view at block 534. Processing continues to block 531 where the extended view operating state is maintained in an IDLE state. The electronic system in the electronic device monitors the user interface (e.g., the four selector) while in the extended view IDLE state. When the user activates one or more of the four selectors, processing leaves the extended view IDLE state.

The display actively maintains the current extended view while the extended view IDLE state is active at block 531. Extended views include graphical and/or textual elements that are arranged in a display view. Extended views may be accompanied by the activation of sound that provides an audible indicator that the extended view has changed. The sound associated with the audible indicators may be the same for each extended view (e.g., a beep type of indicator or sound clip), or unique based on the particular extended view.

Processing flows from the extended view IDLE state (531) to the "previous view" or "previous item" function (532) when the "a" selector is activated (e.g., depressing an "a" button). Processing continues from block 532 to block 534, where the display is updated based on the newly selected extended view. After the display is updated, processing returns to the extended view IDLE state (531). In one example, the previous view corresponds to the last extended view when the currently selected extended view is the first available extended view for the current channel/mode. In another example, the previous extended view corresponds to a null when the currently selected extended view is the first available extended view in the current channel/mode.

Processing flows from the extended view IDLE state (531) to the "next view" or "next item" function (533) when the "b" selector is activated (e.g., depressing an "b" button). Processing continues from block 533 to block 534, where the display is updated based on the newly selected extended view. After the display is updated, processing returns to the extended view IDLE state (531). In one example, the next view corresponds to the first extended view when the currently selected extended view is the last available extended view for the current channel/mode. In another example, the next extended view corresponds to a null when the currently selected extended view is the last available extended view in the current channel/mode.

Processing flows from the extended view IDLE state (531) to the "mode splash" function when the "c" selector is activated as indicated by "M". Refer to FIG. 5D and related discussion for details.

Processing flows from the extended view IDLE state (531) to the view function when the "d" selector is activated as indicated by "V". In another example, processing flows from the extended view IDLE state (531) to the view function when a timeout interval expires (e.g., 5 seconds). Refer to FIG. 5B and related discussion for details concerning the view functions.

Processing flows from the extended view IDLE state (531) to the select home channel splash function when the "c+" selector is activated as indicated by "H". Refer to FIG. 5A and related discussion for details.

Special functions may be mapped to the "a", "b", "a+", and "b+" selectors within the context of the current view. By activating the corresponding selector for a predetermined time interval (e.g., a 2 second timeout interval) the corresponding special function is activated as indicated by block 535. Processing continues from block 535 to block 534 where the display is updated as previously described.

Processing flows from the extended view IDLE state (531) to the process alert function (550) when a trigger alert is activated (e.g., a pre-specified time or event occurs). After the alert is processed, processing flows to block 534, where the extended view is updated. The alert mode operating state is described in further detail below with reference to FIG. 5E.

Mode Splash Operating State

The mode splash operating state is described as follows below with reference to FIG. 5D.

The electronic device enters the mode splash operating state at entry point M. The display is updated to indicate the currently selected mode at block 545. Processing continues to block 541 where the mode splash operating state is maintained in an IDLE state. The electronic system in the electronic device monitors the user interface (e.g., the four selector) while in the mode splash IDLE state. When the user activates one or more of the four selectors, processing leaves the mode splash IDLE state.

Figure 6:
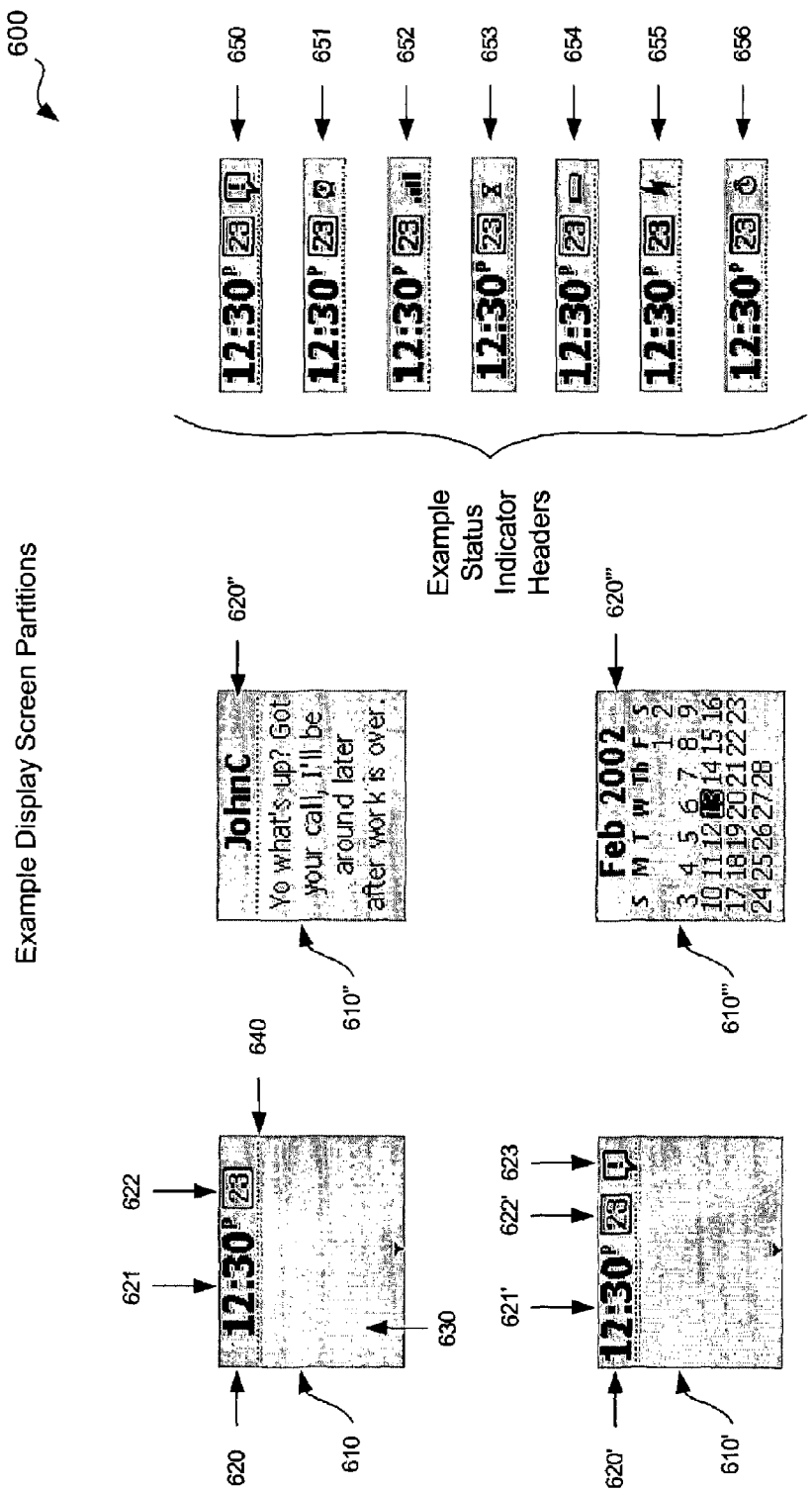
FIG. 6 is an illustration of an example screen partition.

The display actively maintains the current mode splash display while the mode splash view IDLE state is active at block 541. Mode splash views include graphical and/or textual elements that are arranged in a display view. Example mode splash displays for a calendar channel are illustrated in FIG. 6. Mode splash displays may be accompanied by the activation of sound that provides an audible indicator that the selected mode has changed. The sound associated with the audible indicators may be the same for each mode splash (e.g., a beep type of indicator or sound clip), or unique based on the particular mode selected.

Processing flows from the mode splash IDLE state (541) to the "previous mode" function (542) when the "a" selector is activated (e.g., depressing an "a" button). Processing continues from block 542 to block 544, where the display is updated based on the newly selected mode. After the display is updated, processing returns to the mode splash IDLE state (541). In one example, the previous mode corresponds to the last mode when the currently selected mode is the first available mode for the current channel.

Processing flows from the mode splash IDLE state (541) to the "next mode" function (543) when the "b" selector is activated (e.g., depressing an "b" button). Processing continues from block 543 to block 544, where the display is updated based on the newly selected mode. After the display is updated, processing returns to the mode splash IDLE state (541). In one example, the next mode corresponds to the first mode when the currently selected mode is the last available mode for the current channel.

Processing flows from the mode splash IDLE state (541) to the "channel splash" function when the "c" selector is activated as indicated by "CS". Refer to FIG. 5A and related discussion for details.

Processing flows from the mode splash IDLE state (541) to the "select default view" function (545) when the "d" selector is activated. Alternatively, processing may flow from the mode splash IDLE state (541) to the "select default view" function (545) when a timeout interval (e.g., a 2 second interval) has expired. Processing continues from block 545 to the channel view operating state as indicated by "V". Refer to FIG. 5B and related discussion for details.

Processing flows from the mode splash IDLE state (541) to the select home channel splash function when the "c+" selector is activated as indicated by "H". Refer to FIG. 5A and related discussion for details.

Processing flows from the mode splash IDLE state (541) to the process alert function (550) when a trigger alert is activated (e.g., a pre-specified time or event occurs). After the alert is processed, processing flows to block 544, where the mode splash is updated. The alert mode operating state is described in further detail below with reference to FIG. 5E.

Alert Mode Operating State

The alert mode operating state is described as follows below with reference to FIG. 5E. The electronic device enters the alert mode operating state when a trigger alert is activated (e.g., a pre-specified time or event occurs).

Electronic devices may include multiple types of alerts that are based on a trigger. Triggers can generally be categorized as time based triggers, event based triggers, and peer-to-peer based triggers. Example time-based triggers include timer based functions and scheduler based functions. Example event-based triggers include internal alert functions and message based alert functions. Example internal alert functions include low battery warnings, stolen device warnings, and registration warnings. Example timer based functions includes alarm clock functions and chronograph functions such as countdown timers. Example scheduler based functions include scheduled appointments and scheduled events based on a calendar. Example message based functions include notification that a new message has arrived. Example peer-to-peer based triggers are provided as communications from a local transmission such as from another electronic device.

Various triggers may be associated with content that is received in a broadcast transmission as was previously described above. For example, scheduled appointments may be associated with a calendar channel, where the calendar channel includes content that is associated with the user's personal schedule. At the designated time associated with the schedule, the trigger alert is activated to notify the user of an upcoming appointment. The notification may be a one-time notification, or a recurring reminder until the appointment expires. The notification interval can be configured by the user such that notification may be: inactive, a one-time notification, a recurring notification, as well as others.

The trigger alert is activated when one of the triggers requests service on the electronic device. The trigger may be detected as an interrupt request on the electronic device, a service request from an application program, a message from a broadcast transmission, or any other reasonable way of notifying the electronic device that an alert has been activated. After the alert is received, the electronic device can store the current state of the electronic device (e.g., the current mode, channel, operating state, and parameters) and analyzes the trigger to identify the trigger at block 551.

Processing flows from block 551 to block 552 when the alert is identified as a registration alert. At block 552, the display is initialized with the alert screen that corresponds to the registration alert such as screen 710 that is identified in FIG. 7. Processing continues from block 552 to block 556, which corresponds to the alert mode IDLE process.

Processing flows from block 551 to block 553 when the alert is identified as a scheduled alarm or scheduled timer based alert. At block 553, the display is initialized with the alert screen that corresponds to an alarm or timer screen such as screen 730 that is identified in FIG. 7. Processing continues from block 553 to block 556, which corresponds to the alert mode IDLE process.

Processing flows from block 551 to block 554 when the alert is identified as a scheduled appointment. At block 554, the display is initialized with the alert screen that corresponds to a scheduled appointment such as screen 730 that is identified in FIG. 7. Processing continues from block 554 to block 556, which corresponds to the alert mode IDLE process.

Processing flows from block 551 to block 555 when the alert is identified as a low battery alert. At block 555, the display is initialized with the alert screen that corresponds to a low battery alert such as screen 720 that is identified in FIG.

7. Processing continues from block 555 to block 556, which corresponds to the alert mode IDLE process. Depending on the particular alert screen, the alert mode IDLE process may continue to update certain portions of the screen until the screen is dismissed.

The alert mode IDLE process monitors values that are associated with the particular alert screen, and updates those values accordingly. For example, the alert mode IDLE process will continue to update a countdown timer value that is associated with an upcoming appointment while the appointment alert screen is active. In another example, the alert mode IDLE process will update the screen to indicate changes in stock prices associated with a monitored stock index when an alert screen for the stock index is active.

Each trigger type may have an alert screen that can be customized based on the alert function. In one example, the alert screen for a timer or alarm based function has a null or empty header region. In an example scheduled appointment alert, a portion of an appointment detail is placed in the header region, while the time remaining until the appointment is placed in the main body region. In an example low battery alert, the header region includes the words "Low Battery", while the main body region includes a graphical symbol and text that describes the estimated remaining battery life (e.g., 10%, 15%, etc.). Alert screens can also be customized by a content provider for events that are associated with content that is stored on the device. In some implementations, the main body region is dynamically changed when the device is in the IDLE state until the selected alert is dismissed.

At block 556, the user interface is monitored by the electronic device. Processing continues from block 556 to block 557 when a timeout occurs without the activation of a selector during the alert mode IDLE process. At block 557, the display screen of the electronic device transitions form the alert screen to another screen. The other screen may correspond to an alternate view for the alert screen, as well as some other view. The screen transition may be provided such as the example described below with respect to FIG. 8. Processing continues form block 557 to block 558, when any one of the selectors is activated. Alternatively, the alert screen may be dismissed by one specific selector, or a combination of selectors as may be desired.

Processing continues from block 556 to block 558 when a user activates any one of the selectors during the alert mode IDLE process. At block 558, the alert screen is dismissed and the display screen is reverts back to the display screen that occurred before the alert trigger occurred.

Occasionally, multiple alerts may be activated at the same time. In this case, the alerts are reviewed based on a priority scheme. In one example, only the highest priority level alert is processed. In another example, the alerts are stacked in order of highest priority so that the electronic device can process each of the alerts. An example priority scheme, listed highest to lowest priority, corresponds to: 1—battery warnings, 2—alarms and timers, 3—calendar, and 4—new message alert. Example alerts are illustrated with respect to FIGS. 9-12 as will be described later.

The above-described example includes processing blocks 552-555, which indicates that the display is updated, revised, or initiated after the specified alert is identified. Other example indicators can be used instead of, or in addition to the visual alert means that are described above. Any appropriate alert may be used, including but not limited to a visual cue, an audible cue, and a vibrating cue. Different cues may be used for each alert. Alternatively, alerts may be categorized into types, where each category has a different alert.

Example visual cues include: a graphical display screen, an animation sequence, a flashing screen, a pop-up display, a screen overlay, a colored screen, a colored pattern for a display screen. An example device may include one or more LED indicators, where a visual cue can be provided by the LED indicator such as: a colored LED, a blinking LED, a blinking sequence for an LED, and a colored blinking sequence for a colored LED. Example audible cues include any combination of: a single tone, a sequence of tones, multiple tones, a sequence of multiple tones, a compressed audio file playback, an uncompressed audio file playback, a MIDI file playback, and a synthesized sound playback. Example vibrating cues include any combination of a single vibration, a repeating vibration, a sequence of vibrations, and a pattern of vibrations that form a rhythm.

Example Display Screen Partitions

FIG. 6 is a diagram (600) illustrating views for display screens (610, 610') on an example electronic device such as a watch that is arranged in accordance with the present invention. Example display screen (610) is partitioned into two regions: a header region (620) and a main body region (630).

The main body region of the display screen may include one or more graphical and/or textual information fields that change based on the current context in the current channel, mode, and operating state. In one example context, the main body region is a single text region for displaying a text message (610"). In another example context, the main body section (610") may include a graphical representation of the current month in a calendar.

The header region of the display screen may include one or more graphical and/or textual information fields that change based on the current context in the current channel, mode, and operating state. In one example context, the header section (620) may include two regions: a current time field (621) and a current date field (622). In another example context, the header section (620') may include three regions: a current time field (621'), a current date field (622'), and a status indicator field (623). In yet another example context (e.g., a message view), the header section (620") includes an identifier for a message (e.g., the originator of the message might be "JohnC"). In still another example context (e.g., a calendar month view), the header section (620") may include a single field for a date such as "Feb 2002".

Status indicators may be associated with various conditions such as alerts in the electronic device. One example header (650) includes a status indicator for an internal alert such as an exclamation point symbol. Another example header (651) includes a status indicator that an alarm is set such as an alarm clock symbol. Yet example header (652) includes a status indicator of signal strength in a wireless connection such as signal strength bars. Still another example header (653) includes a status indicator that a timer is running such as an hourglass symbol. Yet still another example header (654) includes a status indicator that the battery is low such as an empty battery symbol. Still another example header (655) includes a status indicator that the battery is charging such as a lightning bolt symbol. Still yet another example header (656) includes a status indicator that a timer is running such as a chronograph symbol.

Example Alert Screens

Figure 7:
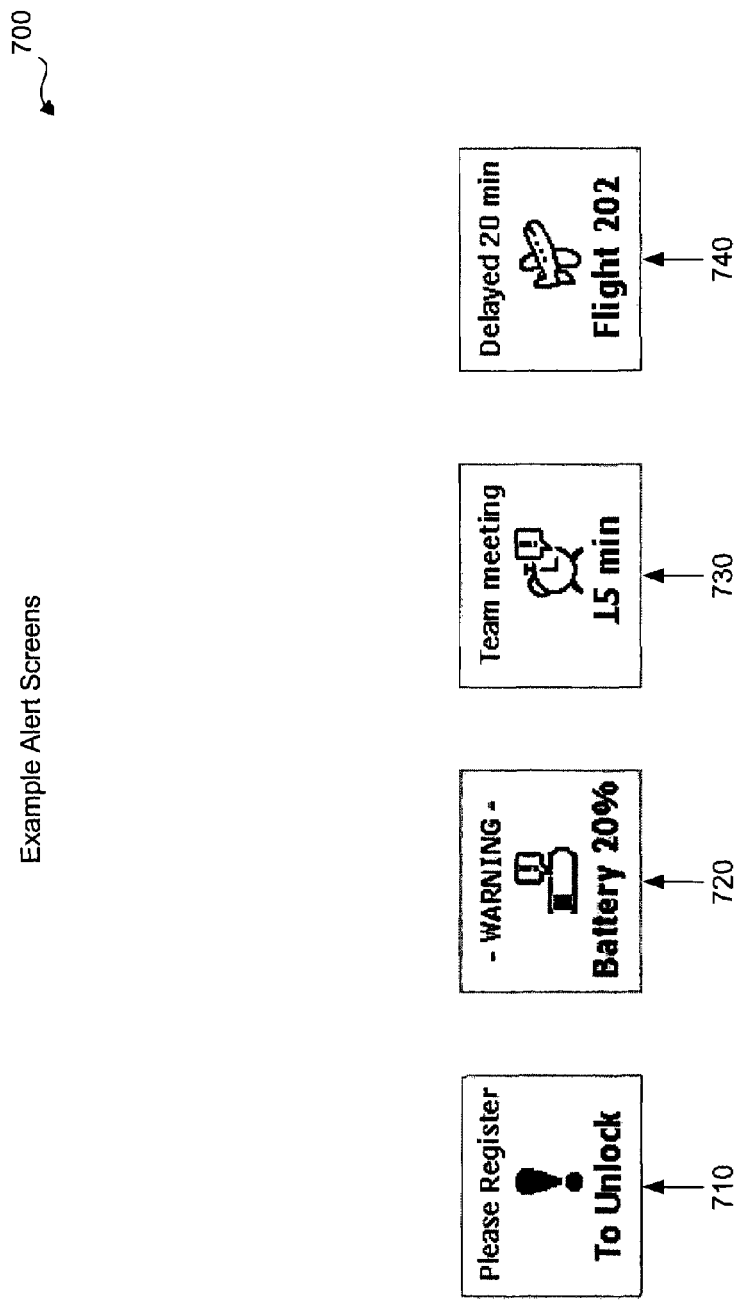
FIG. 7 is an illustration of example alert screens.

FIG. 7 is a diagram (700) illustrating example views for alert screens. The alert display screens may be partitioned into header and main body sections. The header and main body sections may be context sensitive such that they change based on the type of alert function that is activated. Example alert screens may be related to internal alert functions, timer based alert functions, scheduled based alert functions, and message based alert functions.

Alert screens 710 and 720 are illustrations of display screens for internal alert functions. Example internal alert functions include low battery warnings, stolen device warnings, and registration warnings. Alert screen 710 includes a header region that indicates "Please register", and a main body that is partitioned into two regions. The first region of the main body has a graphical representation of an exclamation point, while the second region of the main body indicates "To Unlock". Alert screen 720 includes a header region that indicates "WARNING", and a main body that is partitioned into two regions. The first region of the main body has a graphical representation of a battery that is draining, while the second region of the main body indicates "Battery 20%".

Alert screens 730 and 740 illustrate display screens for scheduled appointment alert functions. Example schedule based functions include scheduled appointments and scheduled events based on a calendar. Alert screen 730 includes a header region that indicates "Team meeting", and a main body that is partitioned into two regions. The first region of the main body has a graphical representation of an alarm clock, while the second region of the main body indicates the time to the appointment as "15 min". In some alert screens (see previous discussion), the values that are used in the main body may be updated to reflect changes (e.g., a change in battery by %, a change in a countdown timer, a delayed flight arrival time, etc.). Alert screen 740 includes a header region that indicates "Delayed 20 minutes", and a main body that is partitioned into two regions. The first region of the main body has a graphical representation of an airplane, while the second region of the main body indicates the flight number as "Flight 202".

Example timer based functions includes alarm clock functions and chronograph functions such as countdown timers. Example message based functions include notification that a new message has arrived.

Transition Sequences

The transition sequence may correspond to any desired visual graphic effect to indicate a transition between the last selected view and the next selected view. One example visual graphic effect corresponds to a fade-out of the last selected view and a fade-in of the next selected view. Another example visual graphic effect corresponds to a splash screen. Still another example visual graphic effect corresponds to a screen wipe. In another example, an audible effect is provided to indicate a change in the current view. Any combination of audible and visual cues may be employed as a transition sequence. Alternatively, the transition sequence may be eliminated or disabled.

Figure 8:
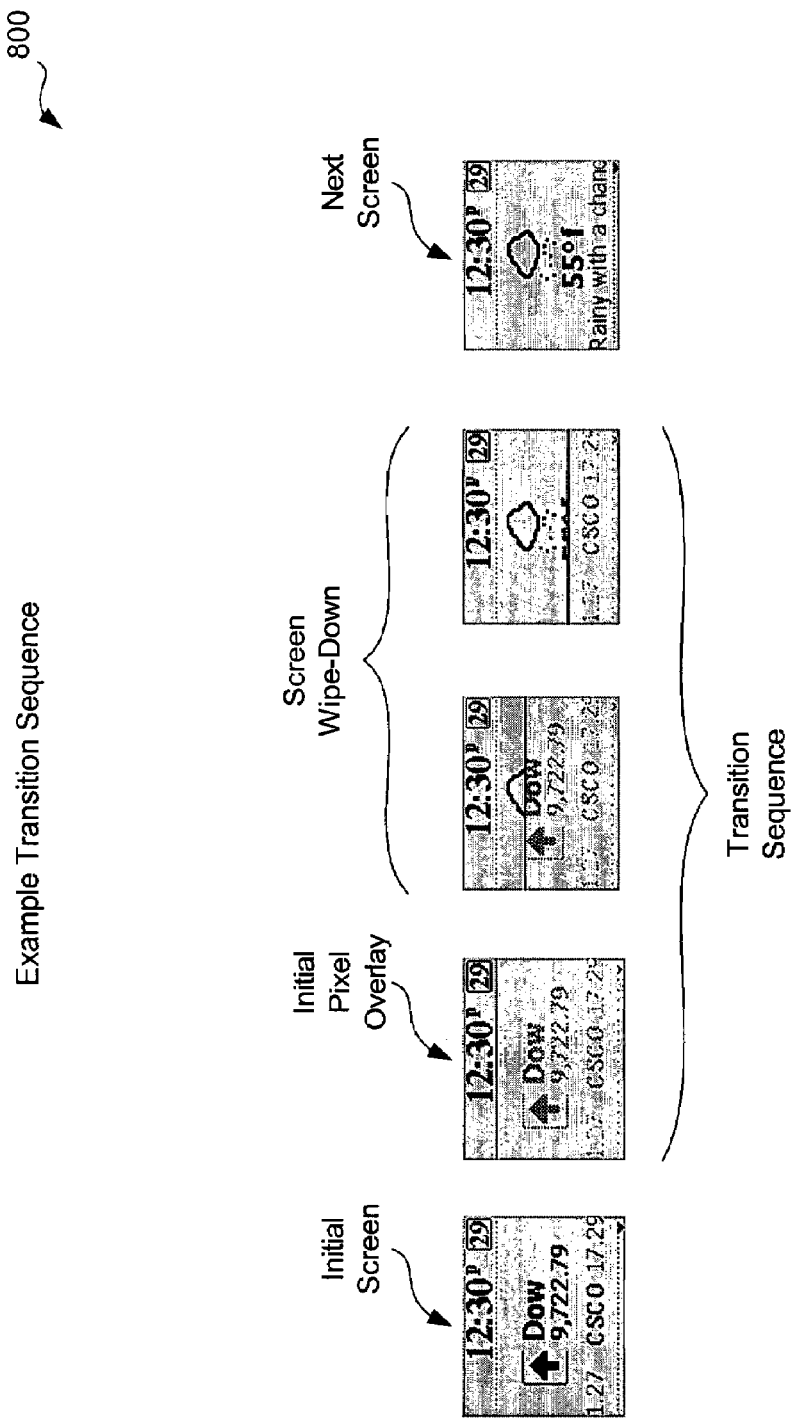
FIG. 8 is an illustration of an example transition sequence.

An example transition sequence (800) that is in accordance with the present invention is illustrated in FIG. 8. An initial screen corresponding to the current view changes to a next view through the transition sequence. An initial pixel overlay is displayed over the initial screen, creating a half-tone effect. A screen wipe-down sequence is then executed, where the next screen is brought into the display as the initial screen is removed from the display. Other screen transitions are equally applicable, including but not limited to a fade effect, and a flash-fade effect. An example fade effect includes can be accomplished with a cross dissolve effect, while an example flash-fade effect can be accomplished by flashing the screen blank and then fading in the new screen view.

In one example, the transition sequence is initiated each time the channel is changed on an electronic device. In other example, the transition sequence is initiated whenever the mode is changed in an electronic device. In still another example, the transition sequence may is initiated after a timeout occurs when the alert mode is active. In yet another example, the transition sequence may be initiated when an alert screen is activated and/or dismissed.

Example Registration Alert

Figure 9:
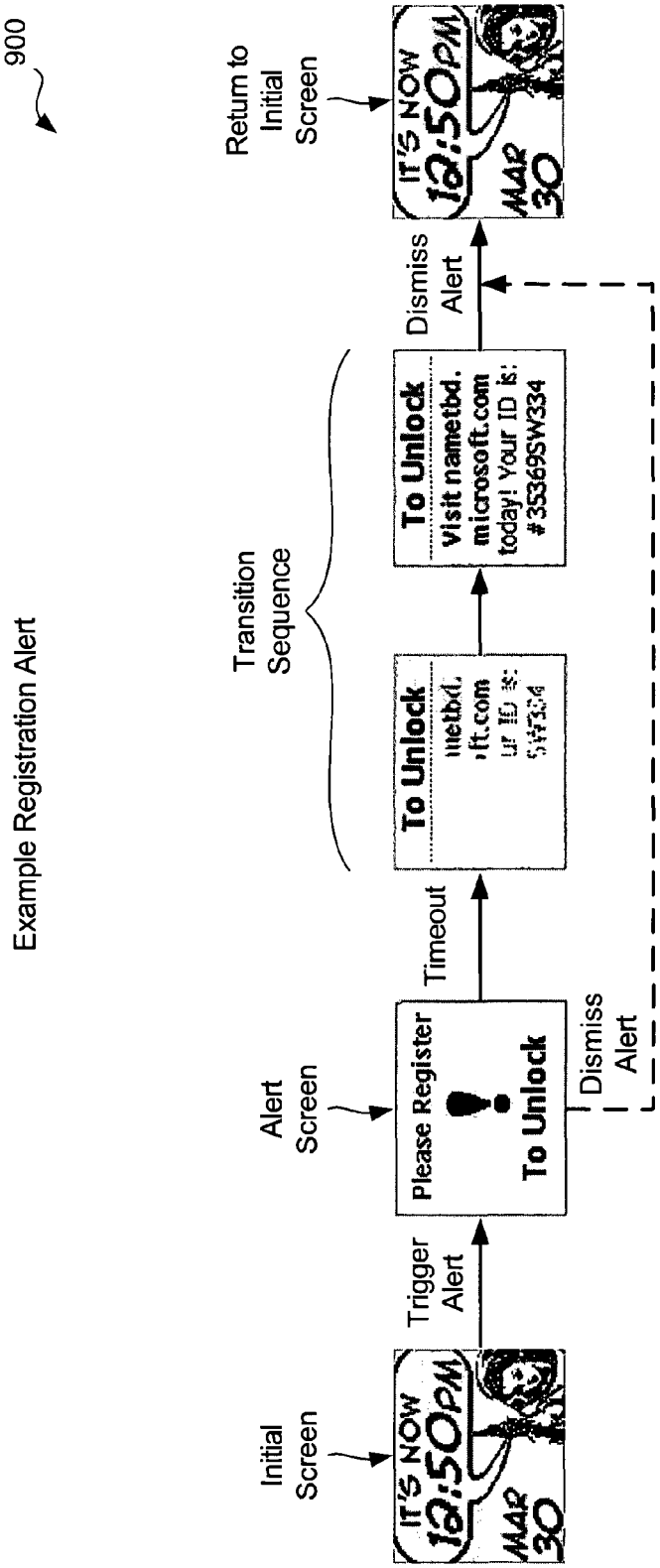
FIG. 9 is an illustration of an example registration alert.

FIG. 9 is an illustration (900) of an example registration alert that is arranged in accordance with the present invention. The initial screen for this example is the current time from a time channel that the user is currently viewing.

After the trigger is detected, the alert screen indicating the registration alert is displayed on the display of the electronic device. The alert screen has two possible views: a main view and an alternate view. Initially, the main view of the alert screen is displayed. The alternate view of the display is activated when a timeout occurs without activation of a selector after the main view is displayed. The main view of the registration alert screen is the same as screen 710 that was described previously with respect to FIG. 7. The alternate view of the alert screen in this example includes a header region that indicates "To Unlock", and a main body region that indicates the user ID and a place to contact for service activation.

In one example, the user does not activate any of the selectors and a timeout occurs that results in a screen transition from the main view to the alternate view with a horizontal screen wipe effect. The electronic device will remain "parked" on the alternate alert screen until the user dismisses the alert with the activation of one of the selectors. Alternatively, the user activates one of the selectors during the main view of the alert screen and the alert screen is dismissed. After the alert screen is dismissed, the parameters, variables, modes, and operating state of the electronic device return back to the initial screen.

Example Battery Alert

Figure 10:
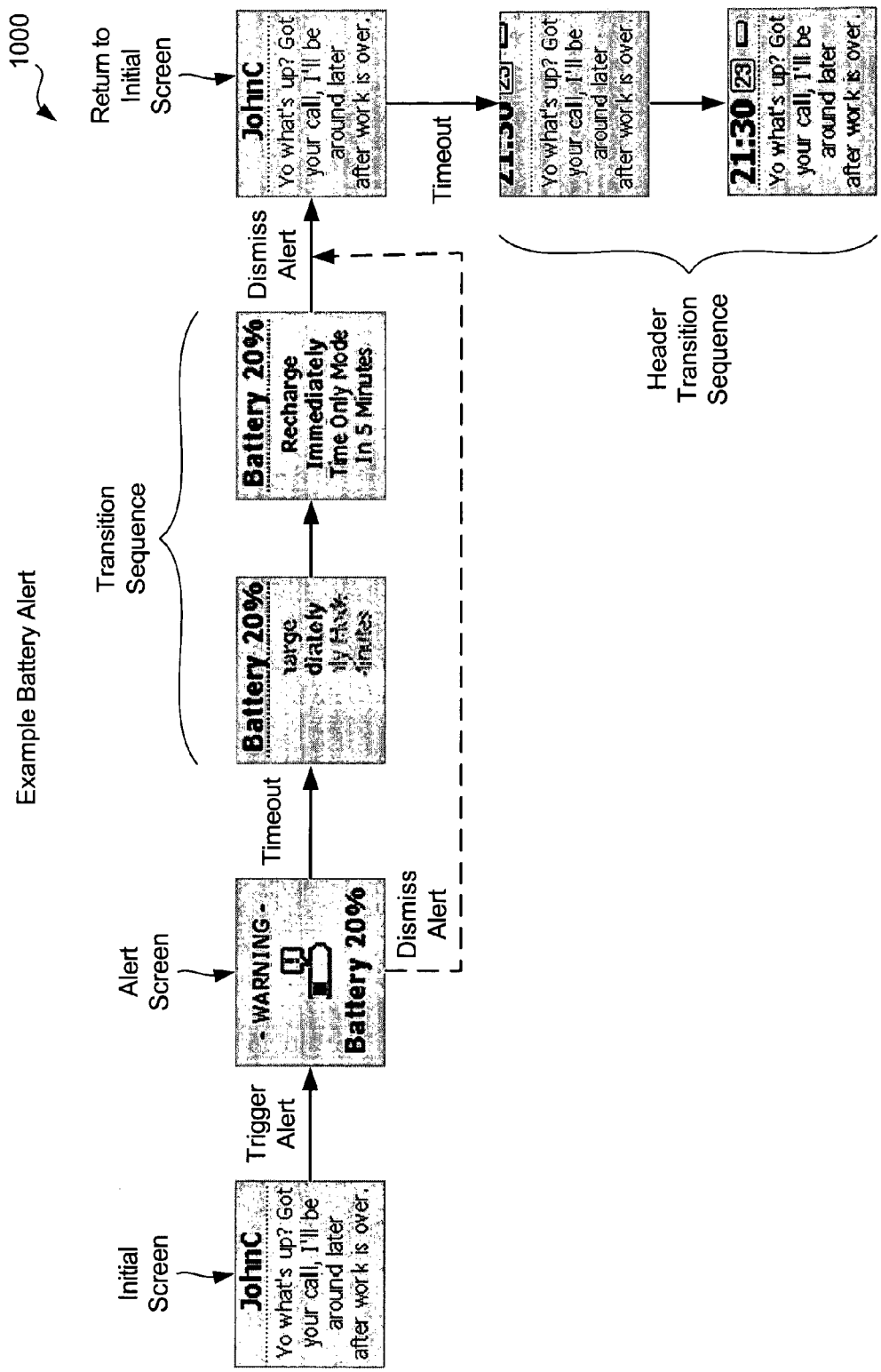
FIG. 10 is an illustration of an example battery alert.

FIG. 10 is an illustration (1000) of an example battery alert that is arranged in accordance with the present invention. The initial screen for this example corresponds to a message from a message channel that the user is currently viewing.

After the trigger is detected, the alert screen indicating the battery alert is displayed on the display of the electronic device. The alert screen has two possible views: a main view and an alternate view. Initially, the main view of the alert screen is displayed. The alternate view of the display is activated when a timeout occurs without activation of a selector after the main view is displayed. The main view of the battery alert screen is the same as screen 720 that was described previously with respect to FIG. 7. The alternate view of the alert screen in this example includes a header region that indicates "BATTERY 20%", and a main body region that indicates a message to recharge. The alternate battery alert screen view may be periodically updated to indicate any changes in the estimated battery life.

In one example, the user does not activate any of the selectors and a timeout occurs that results in a screen transition from the main view to the alternate view with a horizontal screen wipe effect. The electronic device will remain "parked" on the alternate alert screen until the user dismisses the alert with the activation of one of the selectors. Alternatively, the user activates one of the selectors during the main view of the alert screen and the alert screen is dismissed. After the alert screen is dismissed, the parameters, variables, modes, and operating state of the electronic device return back to the initial screen.

Optionally, another view may be available for any one of the non-alert screens (e.g., the initial screen). For the example illustrated in FIG. 10, the header region of the initial screen will periodically change between a main view and an alternate view. The header region of the alternate view includes a low battery status indicator as described previously with respect to header 654 from FIG. 6. In this example, the status indicator may remain active in the header until the battery is changed to some predetermined level (e.g., full battery, greater than 50%, etc.).

Example Appointment Alert

Figure 11:
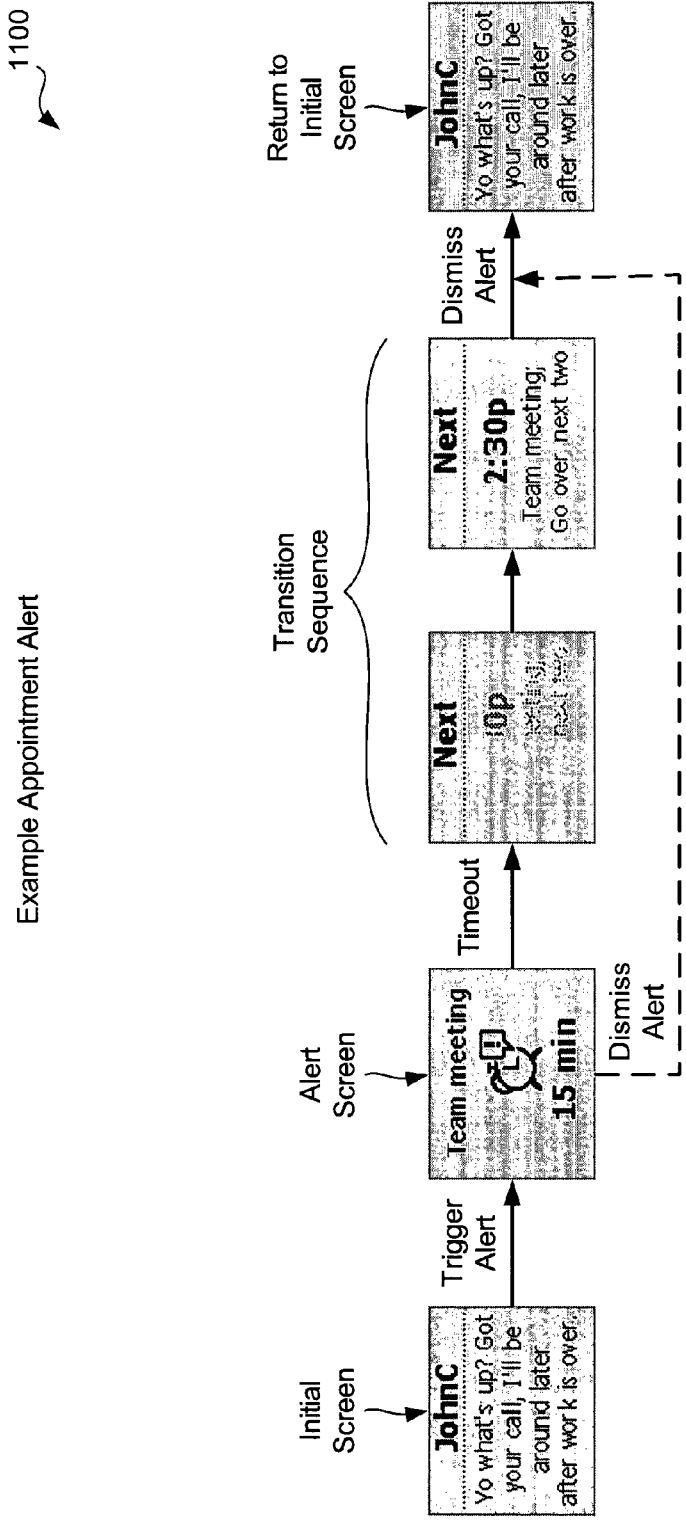
FIG. 11 is an illustration of an example appointment alert.

FIG. 11 is an illustration (1100) of an example appointment alert that is arranged in accordance with the present invention. The initial screen for this example corresponds to a message from a message channel that the user is currently viewing.

After the trigger is detected, the alert screen indicating the upcoming appointment is displayed on the display of the electronic device. The alert screen has two possible views: a main view and an alternate view. Initially, the main view of the alert screen is displayed. The alternate view of the display is activated when a timeout occurs without activation of a selector after the main view is displayed. The main view of the appointment alert screen is the same as screen 730 that was described previously with respect to FIG. 7. The alternate view of the appointment screen in this example includes a header region that indicates "NEXT", and a main body region that indicates the time of the meeting and a portion of the meeting detail. The alternate appointment alert screen view may be periodically updated to indicate any changes in the time until the meeting (see e.g., FIG. 13). Other example header regions may include an indicator such as "TODAY".

In one example, the user does not activate any of the selectors and a timeout occurs that results in a screen transition from the main view to the alternate view with a horizontal screen wipe effect. The electronic device will remain "parked" on the alternate alert screen until the user dismisses the alert with the activation of one of the selectors. Alternatively, the user activates one of the selectors during the main view of the alert screen and the alert screen is dismissed. After the alert screen is dismissed, the parameters, variables, modes, and operating state of the electronic device return back to the initial screen.

Optionally, another view of the non-alert screen (e.g., the initial screen) may be available. For the example illustrated in FIG. 10, the header region of the initial screen may periodically change between a main view and an alternate view.

Example Service Alert

Figure 12:
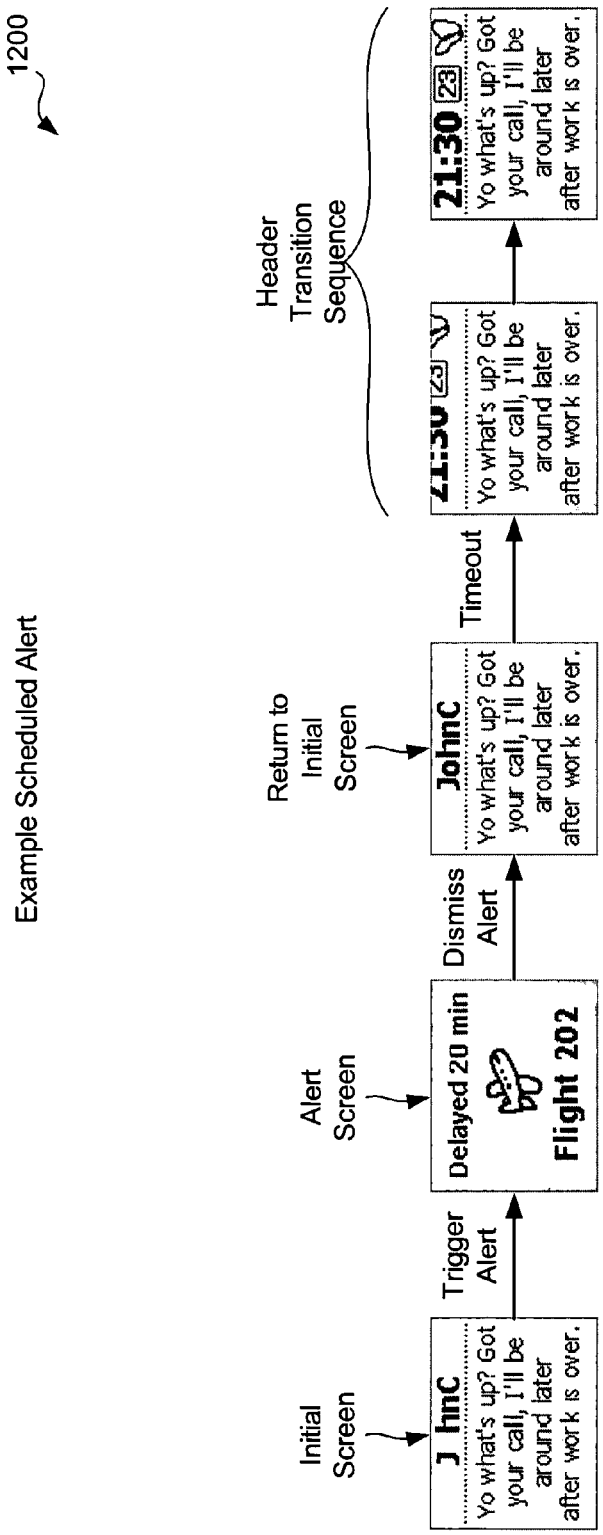
FIG. 12 is an illustration of an example scheduled alert.

FIG. 12 is an illustration (1200) of an example service alert that is arranged in accordance with the present invention. The initial screen for this example corresponds to a message from a message channel that the user is currently viewing. The trigger in this example may be a message that is received from a subscriber based service.

After the trigger is detected, the alert screen indicating the service item (e.g., time of flight arrival) is displayed on the display of the electronic device. The alert screen may have two possible views: a main view and an alternate view. Initially, the main view of the alert screen is displayed. The alternate view of the display is activated when a timeout occurs without activation of a selector after the main view is displayed. The main view of the service alert screen is the same as screen 740 that was described previously with respect to FIG. 7. The main view in this example includes a header region that indicates "Delayed 20 min", and a main body region that indicates the flight number as "Flight 202". The service alert screen view may be periodically updated to indicate any changes in the expected time.

In one example, the user does not activate any of the selectors and a timeout occurs that results in a screen transition from the main view to the alternate view with a horizontal screen wipe effect. The electronic device will remain "parked" on the alternate alert screen until the user dismisses the alert with the activation of one of the selectors. Alternatively, the user activates one of the selectors during the main view of the alert screen and the alert screen is dismissed. After the alert screen is dismissed, the parameters, variables, modes, and operating state of the electronic device return back to the initial screen.

Optionally, another view of the non-alert screen (e.g., the initial screen) may be available. For the example illustrated in FIG. 12, the header region of the initial screen may periodically change between a main view and an alternate view. The alternate view in this example includes a status indicator with a butterfly symbol that indicates that a newly arrived message is available in the messages channel. The highest priority status indicator will be present in the header region of the view.

Example Alternating Status Indicators

Figure 13:
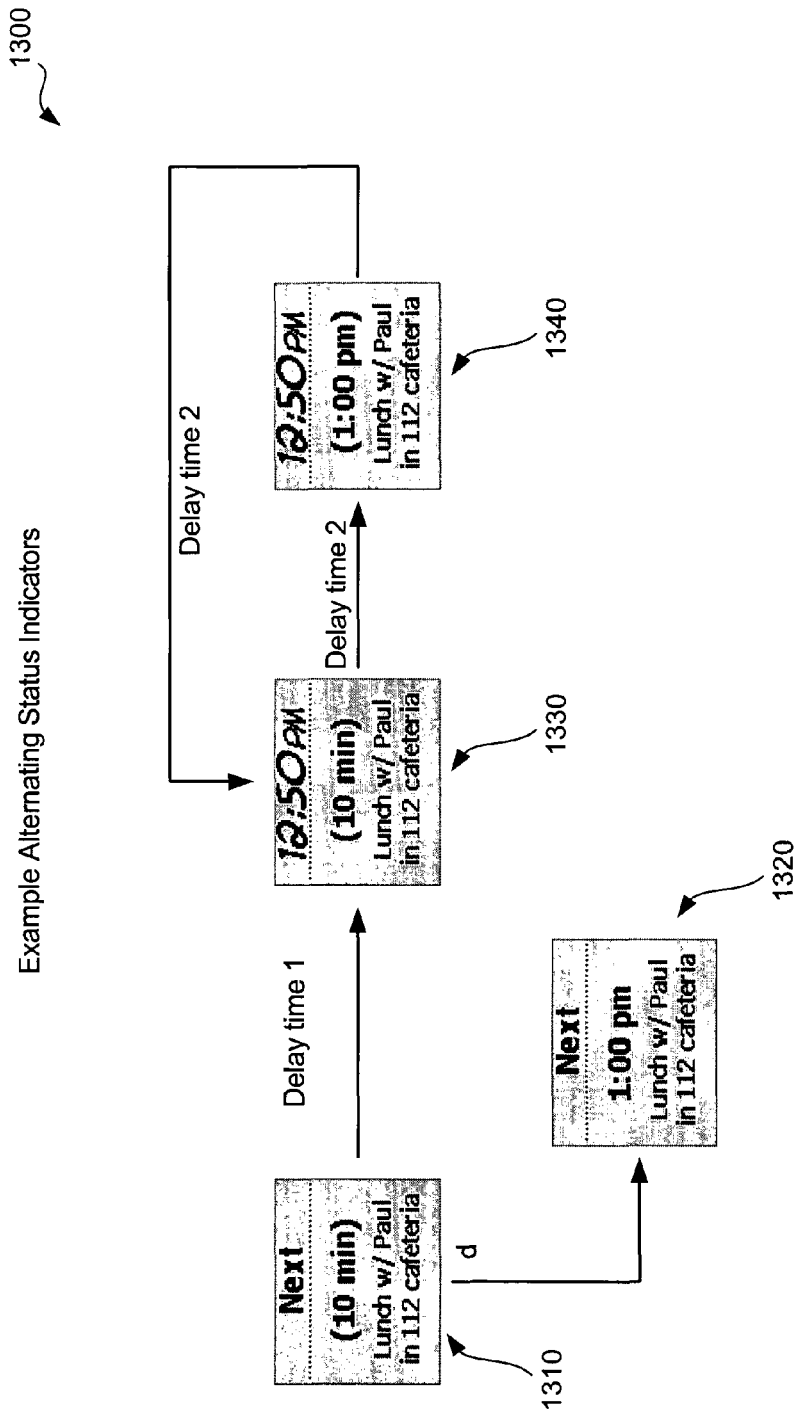
FIG. 13 is an illustration of an alternating status indicator; which are arranged in accordance with the present invention.

Each non-alert screen may have a dynamically changing status that is indicated by alternating views. An example of alternating views is illustrated in FIG. 13. Example display screen 1310 indicates a next appointment that is imminent on the appointment schedule of the calendar channel. As shown in the figure, the next appointment has a header section indicating "Next", a time section indicating "(10 min)", and an appointment summary section "Lunch w/Paul in 112 cafeteria". After a first delay time, display screen 1310 changes as follows: the header section displays the current time as "12:50 PM". After a second delay time, display screen 1330 changes to display screen 1340 by changing the time section to display the appointment time as "(1:00 PM)". After another second delay time, display screen 1340 changes back to display screen 1330. Display screen 1310 also has a detailed view where the time section changes to "1:00 PM" as shown by display screen 1320.

Other example screens (not shown) can be implemented in place of the various views shown in FIG. 13. In one example, the header section may alternate between "Today" and a date such as "Wed 6/10". In another example, the time section may alternate between "in 10 min" and "1:00 PM". In yet another example, a time period for a meeting is indicated such as "1:00 PM-2:00 PM".

The toggling of the display section may be referred to as a passive interaction that is activated by "parking" the electronic device on the particular display screen. The passive interaction is deactivated by activation of one or more selectors on the electronic device.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for alerting a user of a device that includes a user interface, comprising:
   detecting a trigger; wherein the trigger is associated with one of a plurality of different trigger types;
   identifying an alert that is associated with the trigger;
   automatically selecting the alert from a plurality of alerts in response to identifying the alert;
   automatically activating an alert mode operating state in response to the selected alert;

mapping a context of the user interface to another context that is associated with the selected alert when the alert mode operating state is active; and notifying the user of the selected alert through the user interface when the alert mode operating state is active.

2. The method of claim 1, wherein detecting the alert in response to the trigger corresponds to at least one of: detecting an interrupt request on the device, detecting a service request from an application program on the device, and detecting a received broadcast transmission that is received by the device.

3. The method of claim 1, wherein the plurality of different trigger types corresponds to at least one of a time based trigger, an event based trigger, and a peer-to-peer based trigger.

4. The method of claim 1, wherein the trigger corresponds to a time based trigger that is associated with at least one of a scheduler function, a calendar function, an appointment function, an alarm clock function, a chronograph function, and a countdown timer function.

5. The method of claim 1, wherein the trigger corresponds to an event based trigger that is associated with at least one of a low battery warning, a stolen device warning, a registration warning, and a message notification.

6. The method of claim 1, further comprising: prioritizing the identified alert, and selecting the identified alert as the selected alert when the priority of the identified alert satisfies a priority rule.

7. The method of claim 6, wherein the priority rule is arranged to manage identified alerts according to a hierarchy based on at least one of: an assigned priority level that is associated with the identified alert and a time of occurrence that is associated with the identified alert.

8. The method of claim 6, wherein a low battery alert has a higher priority than a message alert.

9. The method of claim 1, further comprising: persisting in the alert mode operating state until the selected alert is dismissed.

10. The method of claim 9, further comprising: dismissing the selected alert in response to a timeout condition that is associated with the selected alert.

11. The method of claim 10, wherein the timeout condition is associated with at least one of: the expiration of a scheduled appointment, the expiration of a scheduled alarm, the expiration of a countdown timer, and the expiration of a specified time.

12. The method of claim 9, further comprising: dismissing the selected alert in response to a selector from the user interface.

13. The method of claim 9, wherein notifying the user of the selected alert corresponds to activating a visual cue with the user interface, wherein the visual cue includes at least one field that is dynamically updated while the alert mode persists.

14. The method of claim 9, further comprising: returning to an initial operating state when the selected alert is dismissed.

15. The method of claim 1, wherein the user interface comprises at least one of: a display screen, a speaker-type device, an LED-type device, and a vibrating-type device.

16. The method of claim 1, wherein notifying the user of the selected alert corresponds to activating a cue on the user interface, wherein the cue corresponds to at least one of: a visual cue, an audible cue, and a vibrating cue.

17. The method of claim 1, wherein the activated cue is associated with at least one of: the selected alert, a type that is associated with the selected alert, and a status that is associated with the selected alert.

18. The method of claim 1, wherein notifying the user of the selected alert corresponds to activating a visual cue that is associated with the selected alert, wherein the visual cue corresponds to at least one of: a graphical display screen, an animation sequence, a flashing screen, a pop-up display, a screen overlay, a colored screen, a colored pattern for a display screen, a colored LED, a blinking LED, a blinking sequence for an LED, and a colored blinking sequence for a colored LED.

19. The method of claim 1, wherein notifying the user of the selected alert corresponds to activating an audible cue that is associated with the selected alert, wherein the audible cue corresponds to at least one of: a single tone, a sequence of tones, multiple tones, a sequence of multiple tones, a compressed audio file playback, an uncompressed audio file playback, a MIDI file playback, and a synthesized sound playback.

20. The method of claim 1, wherein notifying the user of the selected alert corresponds to activating a vibrating cue that is associated with the selected alert, wherein the vibrating cue corresponds to at least one of: a single vibration, a repeating vibration, a sequence of vibrations, and a pattern of vibrations that form a rhythm.

21. The method of claim 1, further comprising: activating a transition sequence after a predetermined time interval expires while the alert mode operating state is active.

22. The method of claim 21, wherein the transition sequence comprises at least one of a horizontal screen wipe, a vertical screen wipe, a fade effect, a half-tone effect, a flash-fade effect, a flashing effect, and a cross-dissolve effect.

23. The method of claim 9, further comprising: returning to an initial screen after the selected alert is dismissed, and updating a status indicator of a display in the user interface after the selected alert is dismissed, wherein the status indicator is related to the selected alert.

24. The method of claim 23, wherein the status indicator dynamically changes.

25. A portable apparatus configured for wireless communication, comprising:
    a user interface that includes a display screen and a selector;
    a means for detecting a triggering event;
    a means for identifying an alert that is associated with the triggering event; wherein the alert provides a user an indication that the triggering event has occurred;
    a means for automatically selecting the alert that is identified as associated with the triggering event; wherein the alert is selected from a plurality of different alerts that are each associated with a different type of event;
    a means for activating an alert mode operating state in response to the selected alert;
    a means for mapping a context of the user interface to another context that is associated with the selected alert when the alert mode operating state is active; and
    a means for notifying the user of the selected alert through the user interface when the alert mode operating state is active.

26. The apparatus of claim 25, further comprising: a means for prioritizing the identified alert, and a means for selecting the identified alert as the selected alert when the priority of the identified alert satisfies a priority rule.

27. The apparatus of claim 25, wherein the means for notifying the user of the selected alert corresponds to a means for activating a visual cue that is associated with the selected alert, wherein the visual cue corresponds to at least one of: a graphical display screen, an animation sequence, a flashing screen, a pop-up display, a screen overlay, a colored screen, a colored pattern for a display screen, a colored LED, a blinking LED, a blinking sequence for an LED, and a colored blinking sequence for a colored LED.

28. The apparatus of claim 25, wherein the means for notifying the user of the selected alert corresponds to a means for activating an audible cue that is associated with the selected alert, wherein the audible cue corresponds to at least one of: a single tone, a sequence of tones, multiple tones, a sequence of multiple tones, a compressed audio file playback, an uncompressed audio file playback, a MIDI file playback, and a synthesized sound playback.

29. The apparatus of claim 25, wherein the means for notifying the user of the selected alert corresponds to a means for activating a vibrating cue that is associated with the selected alert, wherein the vibrating cue corresponds to at least one of: a single vibration, a repeating vibration, a sequence of vibrations, and a pattern of vibrations that form a rhythm.

30. The apparatus of claim 25, further comprising: a means for dynamically updating the display screen when the alert mode operating state is active such that content associated with the display screen is updated according to a time interval.

31. The apparatus of claim 25, further comprising: a means for dynamically changing a status indicator region of the display screen, wherein the status indicator region is includes information that is associated with an identified alert.

32. The apparatus of claim 25, further comprising: a means for transitioning the display screen from an alert screen to an initial screen when the alert mode operating state is active over a predetermined timeout interval.

33. The apparatus of claim 25, further comprising: a means for alternating between views on the display screen when the alert mode operating state is active.

34. The apparatus of claim 25, further comprising: a means for transitioning between views on the display screen after the selected alert is dismissed.

35. The apparatus of claim 25, further comprising: a means for transitioning a header region of the display screen after the selected alert is dismissed, wherein the header region includes an indicator that is associated with the selected alert.

36. The apparatus of claim 25, further comprising: a means for prioritizing identified alert, and a means for selecting the identified alert as the selected alert when the priority of the identified alert satisfies a priority rule.

37. The apparatus of claim 25, further comprising: a means for dismissing the selected alert in response to at least one of: a timeout and the activation of the selector in the user interface.

38. An apparatus, comprising:
a user interface that includes a display and a selector; and
an electronic system that is arranged to interact with the user interface and the display, wherein the electronic system is configured to:
detect a trigger alert in response to a trigger;
identify an alert that is associated with the trigger alert;
automatically select the alert from a plurality of alerts in response to identifying the alert;
automatically activate an alert mode operating state in response to a selected alert;
map a context of the user interface to another context that is associated with the selected alert;
notify the user of the selected alert through the user interface when the alert mode operating state is active.

39. The apparatus of claim 38, wherein the user interface includes a vibrating means, and wherein the electronic system is arranged to notify the user of the selected alert by activating the vibrating means when the alert mode operating state is active.

40. The apparatus of claim 38, wherein the user interface includes a sound means, and wherein the electronic system is arranged to notify the user of the selected alert by activating the sound means when the alert mode operating state is active.

* * * * *

UNITED STATES PATENT AND TRADEMARK OFFICE
CERTIFICATE OF CORRECTION

| | | |
|---|---|---|
| PATENT NO. | : 7,433,714 B2 | |
| APPLICATION NO. | : 10/611364 | |
| DATED | : October 7, 2008 | |
| INVENTOR(S) | : Dane M. Howard et al. | |

It is certified that error appears in the above-identified patent and that said Letters Patent is hereby corrected as shown below:

In column 8, line 24, after ""c"," insert -- "d", --.

In column 22, line 28, in Claim 22, delete "of" and insert -- of: --, therefor.

Signed and Sealed this
Third Day of May, 2011

David J. Kappos
*Director of the United States Patent and Trademark Office*